US011485635B2

(12) United States Patent
Kawamoto et al.

(10) Patent No.: US 11,485,635 B2
(45) Date of Patent: Nov. 1, 2022

(54) HYDROGEN GENERATOR

(71) Applicant: AIR WATER INC., Osaka (JP)

(72) Inventors: Tatsuya Kawamoto, Sakai (JP);
Masako Tanaka, Sakai (JP); Yoshiro
Nitta, Sakai (JP); Shinya Kawahara,
Sakai (JP)

(73) Assignee: Air Water Inc., Osaka (JP)

( * ) Notice: Subject to any disclaimer, the term of this patent is extended or adjusted under 35 U.S.C. 154(b) by 260 days.

(21) Appl. No.: 16/762,413

(22) PCT Filed: Oct. 26, 2018

(86) PCT No.: PCT/JP2018/039879
§ 371 (c)(1),
(2) Date: May 7, 2020

(87) PCT Pub. No.: WO2019/093158
PCT Pub. Date: May 16, 2019

(65) Prior Publication Data
US 2020/0283294 A1 Sep. 10, 2020

(30) Foreign Application Priority Data
Nov. 9, 2017 (JP) .............................. JP2017-216343

(51) Int. Cl.
C01B 3/38 (2006.01)
B01J 19/24 (2006.01)
B01J 19/00 (2006.01)

(52) U.S. Cl.
CPC ........... *C01B 3/384* (2013.01); *B01J 19/0013* (2013.01); *B01J 19/24* (2013.01);
(Continued)

(58) Field of Classification Search
CPC .................. B01J 19/0013; B01J 19/24; B01J 2219/00157; B01J 2219/00164;
(Continued)

(56) References Cited

U.S. PATENT DOCUMENTS 4,861,348 A * 8/1989 Koyama ............. H01M 8/0631
422/204
4,932,981 A * 6/1990 Ohsaki ................ H01M 8/0631
48/94
(Continued)

FOREIGN PATENT DOCUMENTS

| JP | 2009-274919 | 11/2009 |
|----|-------------|---------|
| JP | 2016-60649  | 4/2016  |

(Continued)

OTHER PUBLICATIONS

International Search Report, dated Jan. 8, 2019, in International Patent Application No. PCT/JP2019/039879.
(Continued)

*Primary Examiner* — Kaity V Chandler
(74) *Attorney, Agent, or Firm* — Wood, Phillips, Katz, Clark & Mortimer

(57) ABSTRACT

A hydrogen generator having a reforming catalyst that causes hydrocarbon gas and steam to carry out a reforming reaction and reform into a hydrogen rich reformed gas, a reformer that is filled with said reforming catalyst and in which said reforming reaction is carried out, and a combustion chamber for combusting a fuel gas and obtaining reaction heat that is applied to said reforming reaction. At least the reforming region carrying out the reforming reaction is disposed inside the combustion chamber. A steam generator that introduces steam into the reformer is provided outside the combustion chamber.

9 Claims, 15 Drawing Sheets

(52) U.S. Cl.
CPC ............... *B01J 2219/00157* (2013.01); *B01J 2219/00164* (2013.01); *C01B 2203/0233* (2013.01); *C01B 2203/0811* (2013.01); *C01B 2203/1235* (2013.01)

(58) Field of Classification Search
CPC ..... C01B 2203/0233; C01B 2203/0811; C01B 2203/1235; C01B 2203/0288; C01B 2203/043; C01B 2203/1217; C01B 2203/1223; C01B 2203/1241; C01B 2203/1247; C01B 3/384
See application file for complete search history.

(56) References Cited

U.S. PATENT DOCUMENTS

| | | | | |
|---|---|---|---|---|
| 6,331,283 | B1 * | 12/2001 | Roy .................. | B01J 8/1818 423/652 |
| 2003/0131533 | A1 * | 7/2003 | Pham ................ | B01J 8/06 422/204 |
| 2003/0192251 | A1 * | 10/2003 | Edlund .............. | B01B 1/005 422/204 |
| 2004/0068933 | A1 | 4/2004 | Nakamura et al. | |
| 2006/0107594 | A1 * | 5/2006 | Kuwaba ............ | B01J 8/0496 48/61 |
| 2006/0112637 | A1 * | 6/2006 | An ................... | H01M 8/0612 48/61 |
| 2006/0117660 | A1 * | 6/2006 | Woo ................. | C01B 3/384 48/61 |
| 2007/0041894 | A1 * | 2/2007 | Drnevich .......... | C01B 3/386 423/650 |
| 2009/0094894 | A1 * | 4/2009 | Genkin ............. | C01B 3/382 48/197 R |
| 2009/0258263 | A1 * | 10/2009 | Fujioka ............. | B01J 8/0492 422/187 |
| 2009/0317671 | A1 * | 12/2009 | Ukai ................. | B01J 8/0469 422/600 |
| 2011/0014088 | A1 * | 1/2011 | Zubrin .............. | C01B 3/384 422/162 |
| 2012/0104321 | A1 * | 5/2012 | Pham ................ | C01B 3/382 252/373 |
| 2012/0126177 | A1 * | 5/2012 | Meissner .......... | B01J 8/062 422/162 |
| 2016/0023899 | A1 | 1/2016 | Hirakawa et al. | |
| 2017/0062853 | A1 * | 3/2017 | Kakuwa ............ | B01J 8/0285 |

FOREIGN PATENT DOCUMENTS

| | | | | |
|---|---|---|---|---|
| JP | 2017-88488 | | 5/2017 | |
| KR | 20180078522 | * | 7/2018 | ............. C01B 3/384 |
| KR | 20180078522 | A * | 7/2018 | ............. C01B 3/384 |
| WO | 2003/078311 | A1 | 9/2003 | |
| WO | WO-2010058602 | A1 * | 5/2010 | ............... C01B 3/38 |
| WO | WO-2013147598 | A1 * | 10/2013 | ................ B01J 7/00 |
| WO | 2014/156013 | A1 | 10/2014 | |
| WO | WO-2015200128 | A1 * | 12/2015 | .......... B01J 19/1812 |

OTHER PUBLICATIONS

International Preliminary Report on Patentability and Written Opinion of the International Searching Authority, dated May 22, 2020 in Application No. PCT/JP2018/039879.

* cited by examiner

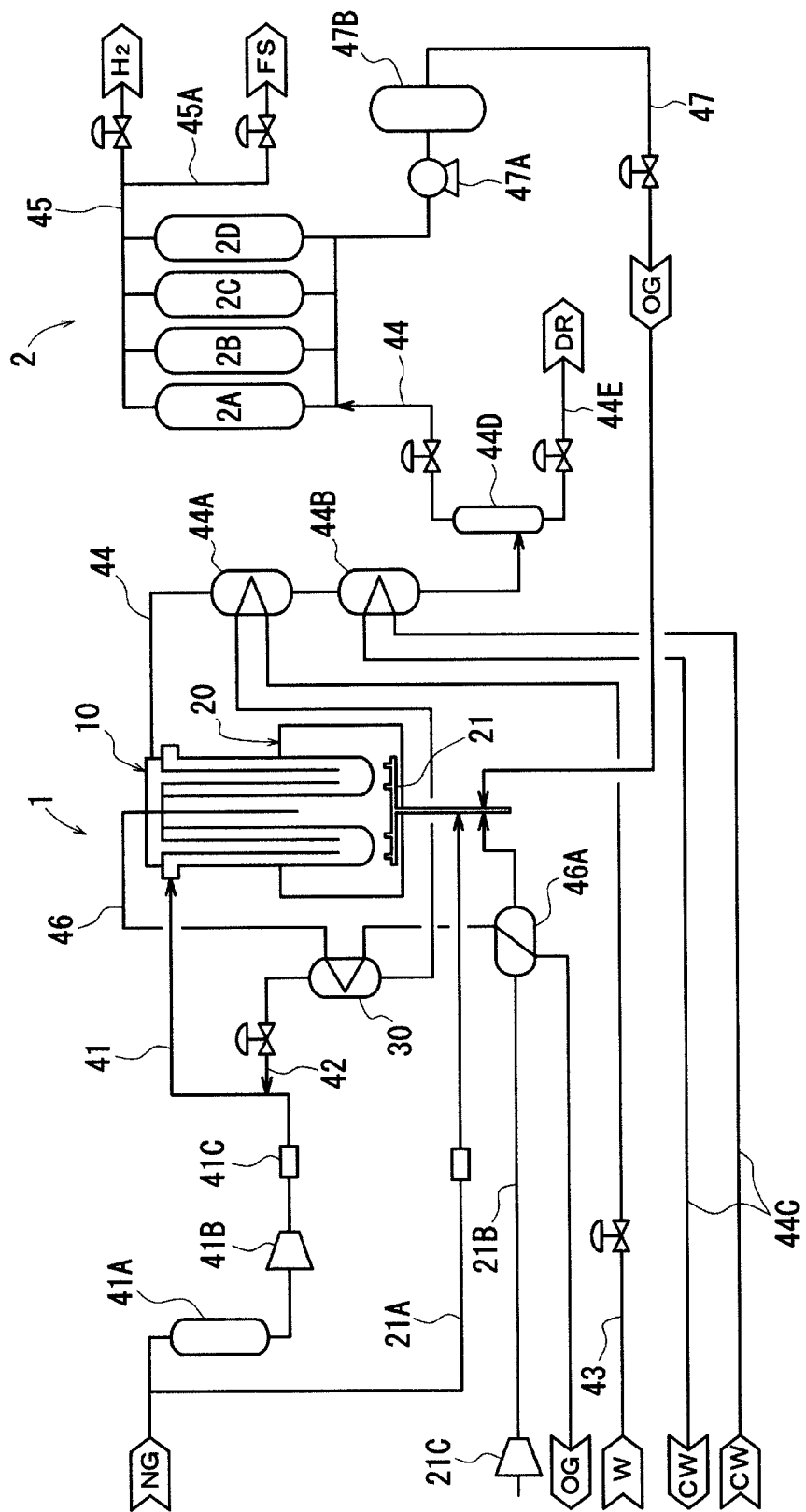
[FIG. 1]

[FIG. 2]
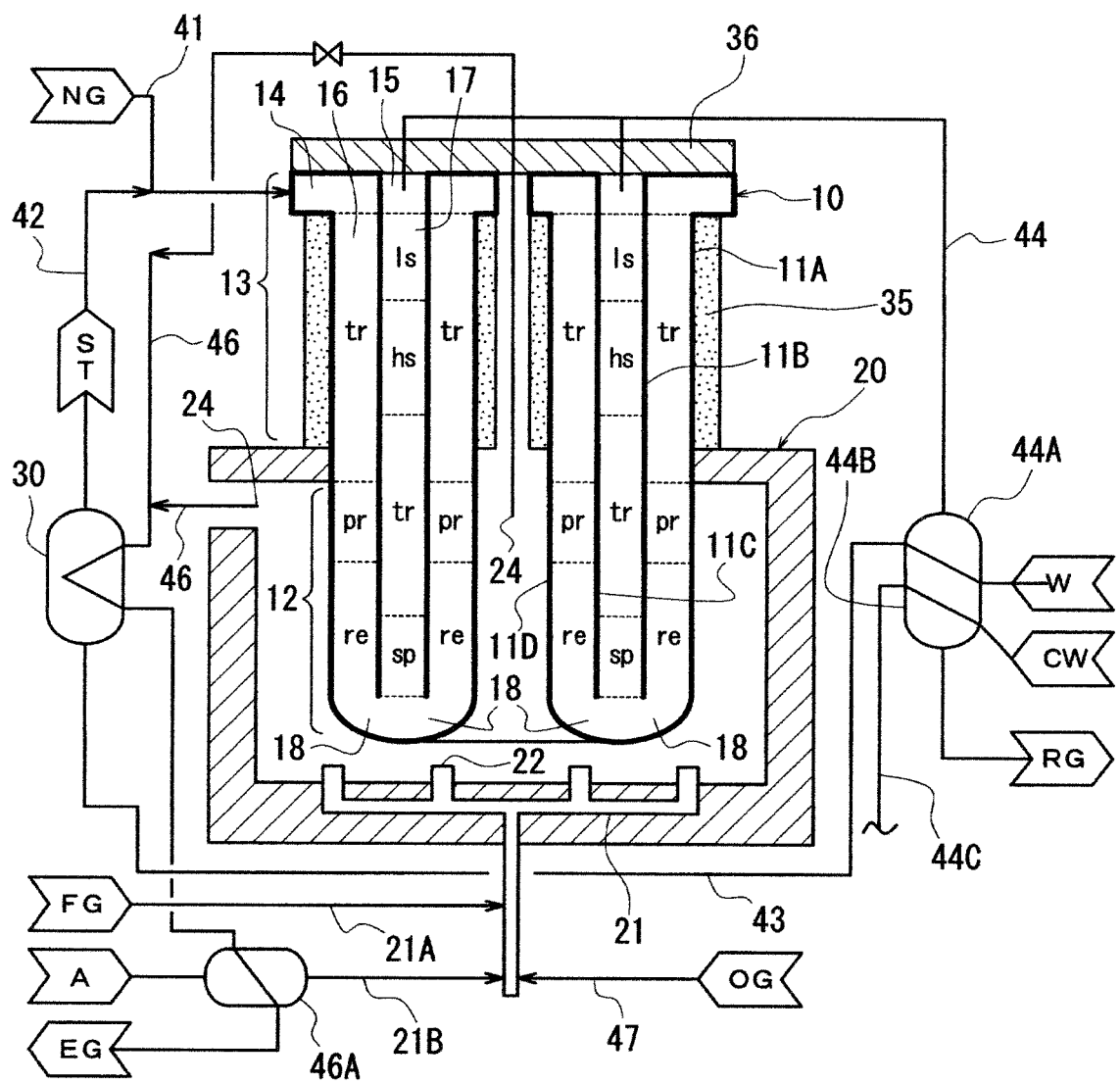

[FIG. 3]
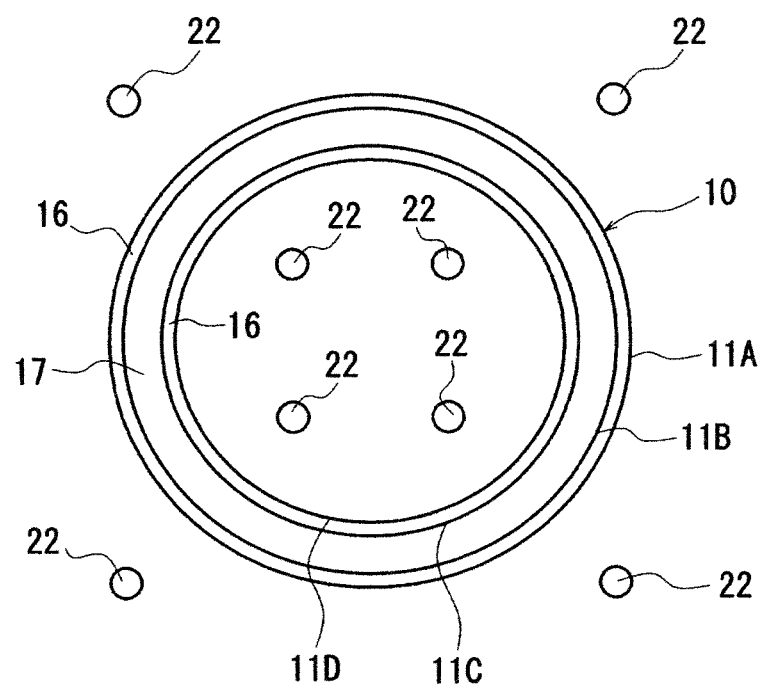

[FIG. 4]
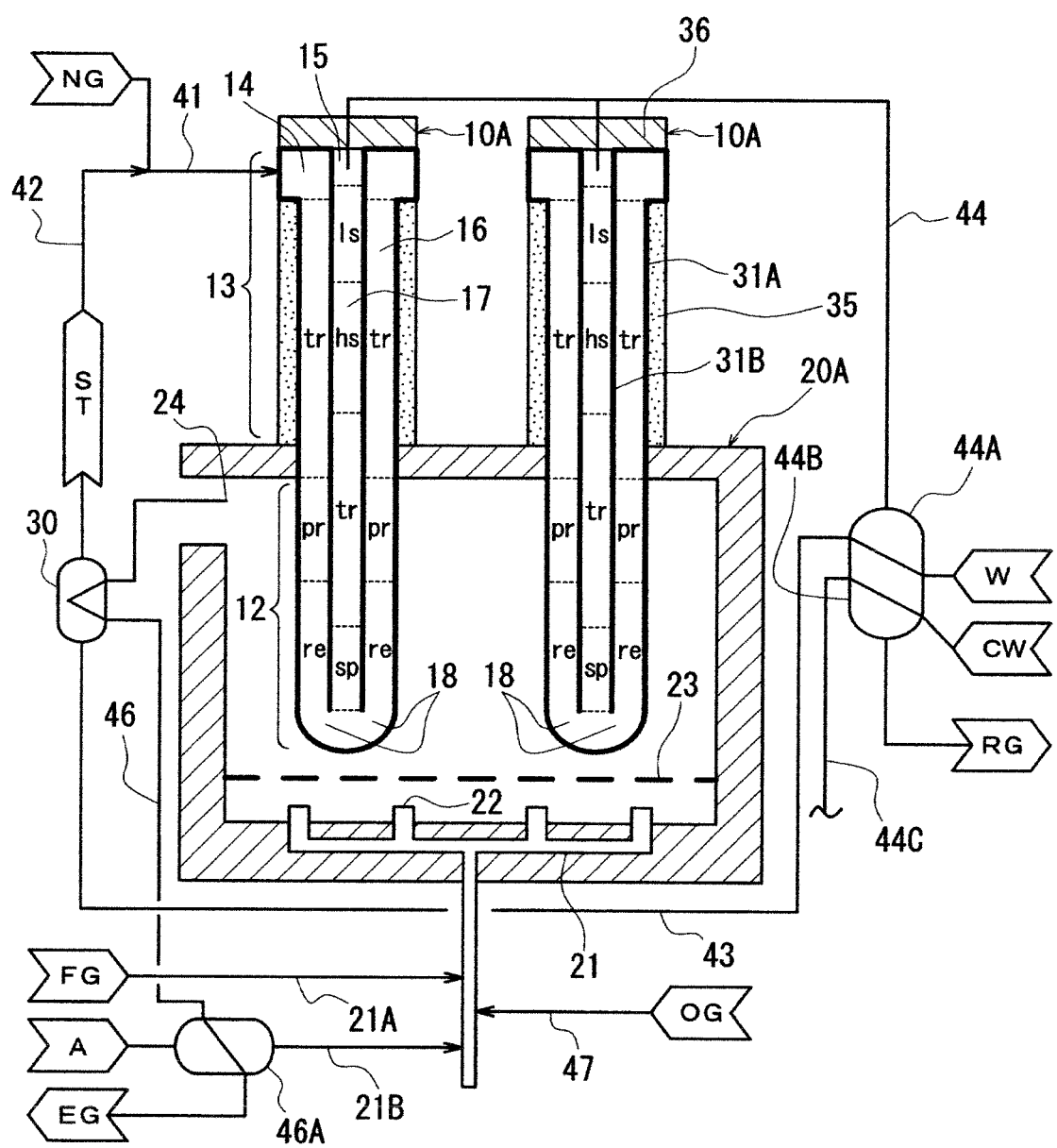

[FIG. 5]
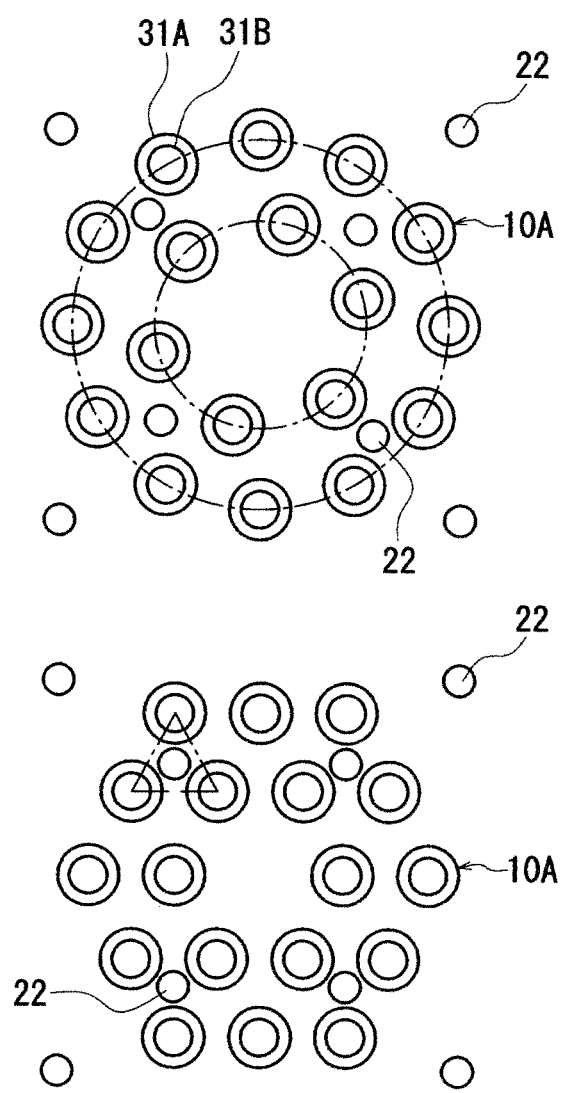

[FIG. 6]
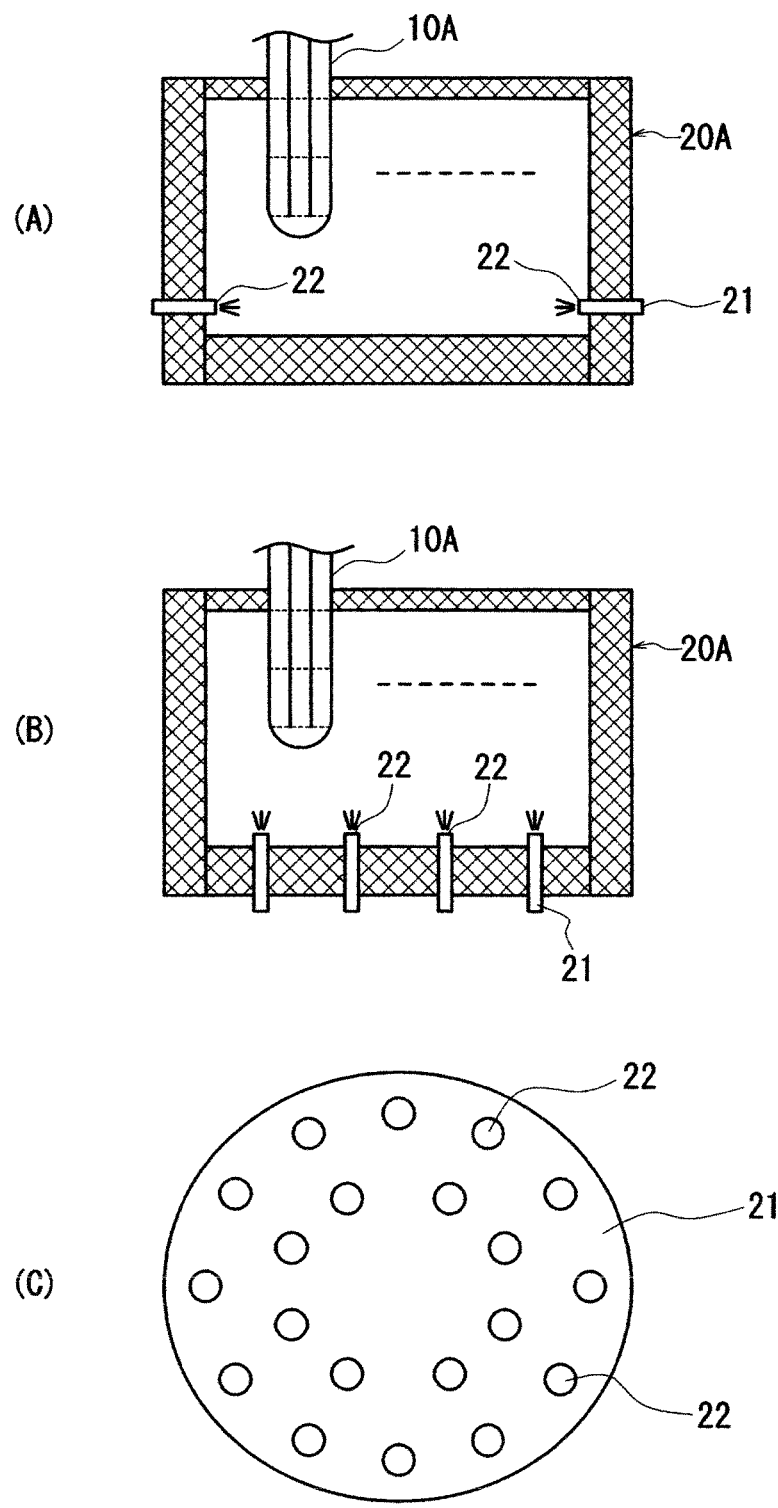

[FIG. 7]
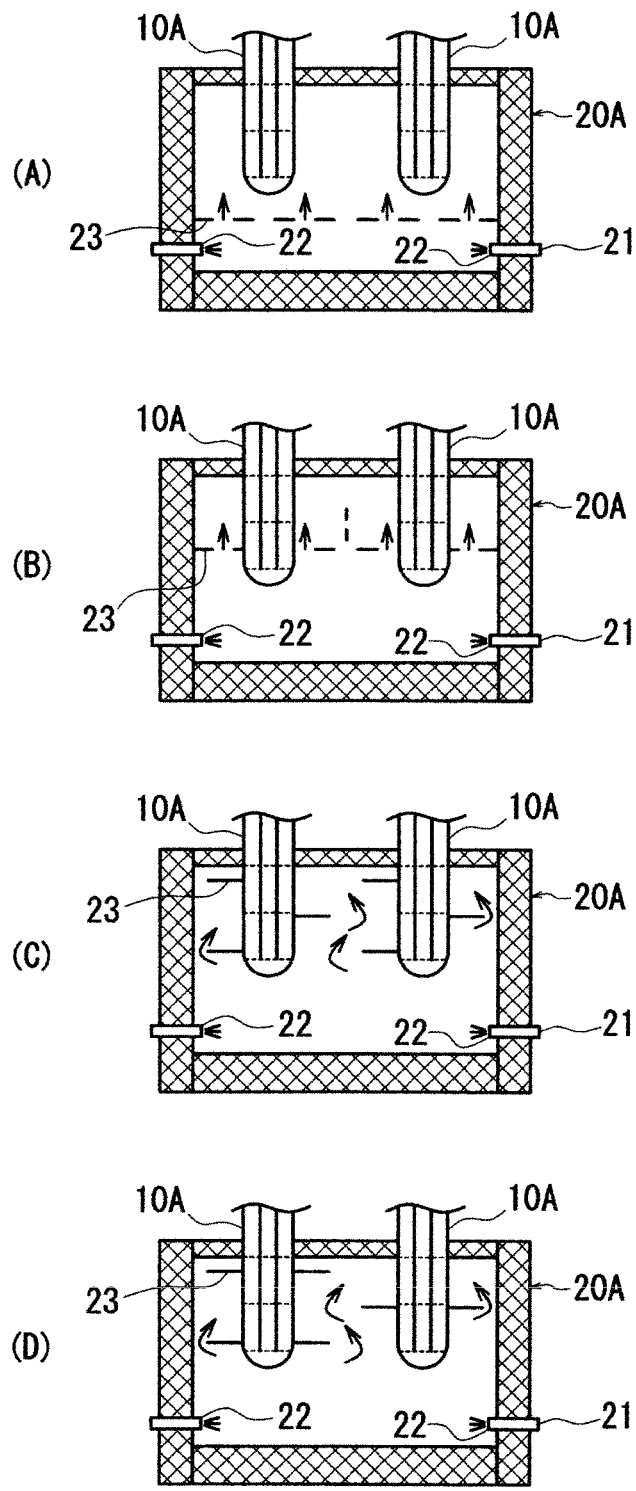

[FIG. 8]
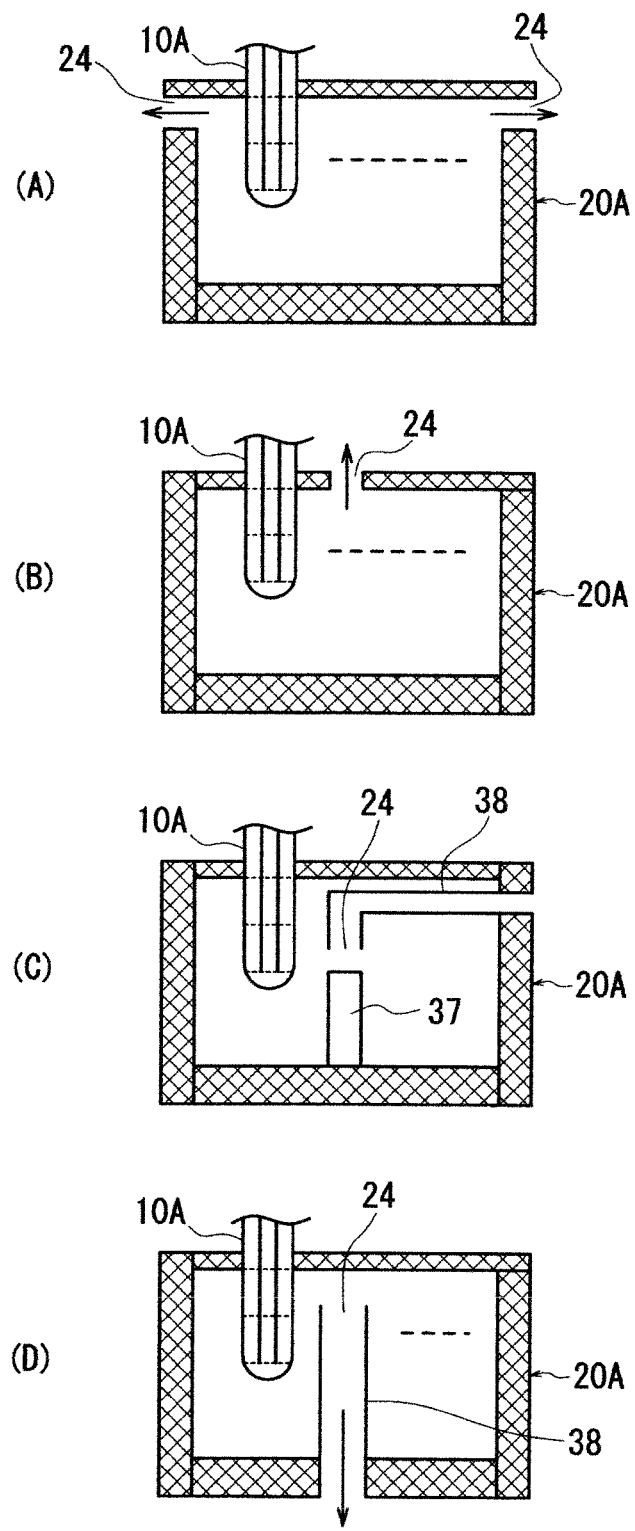

[FIG. 9]
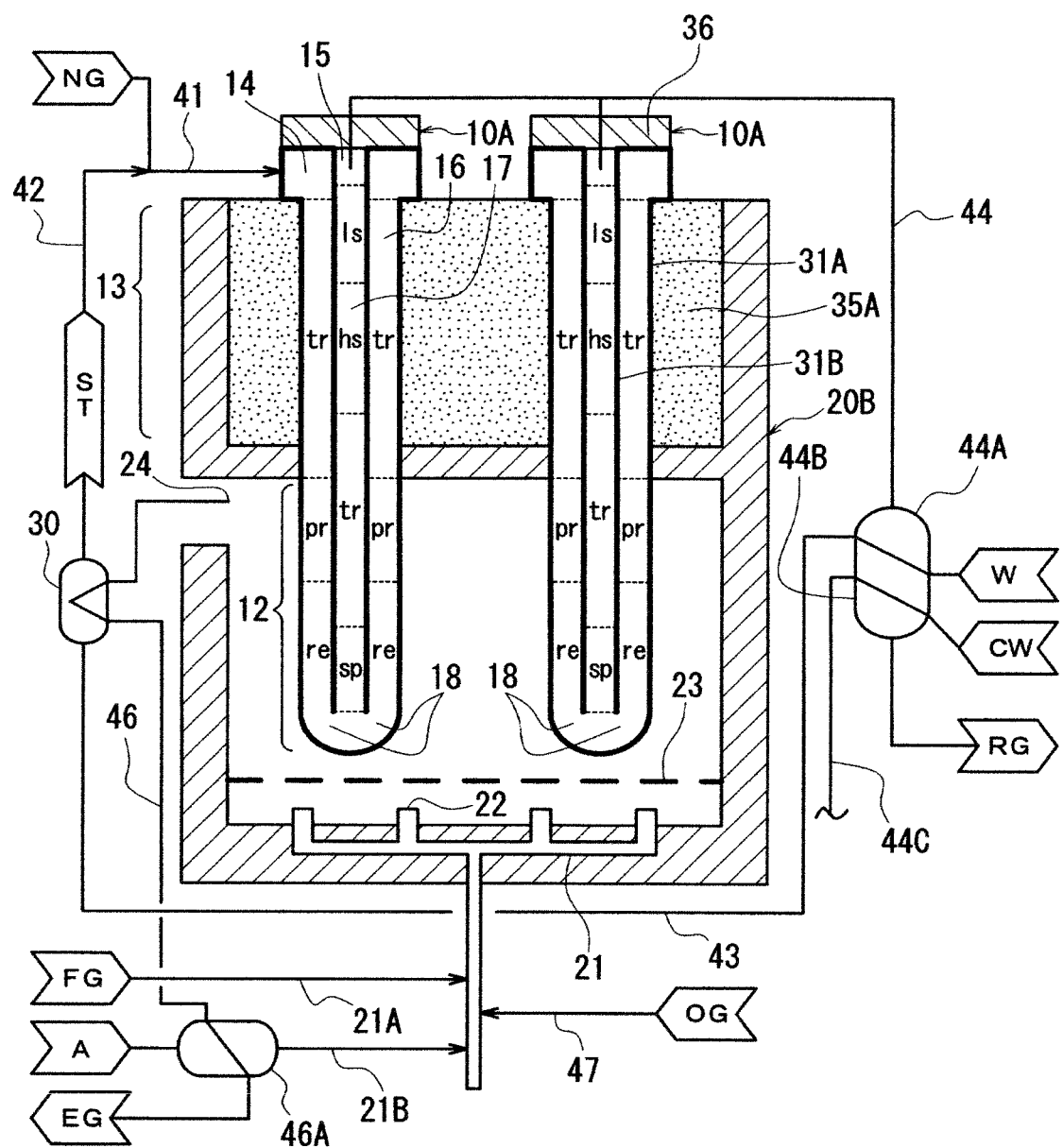

[FIG. 10]
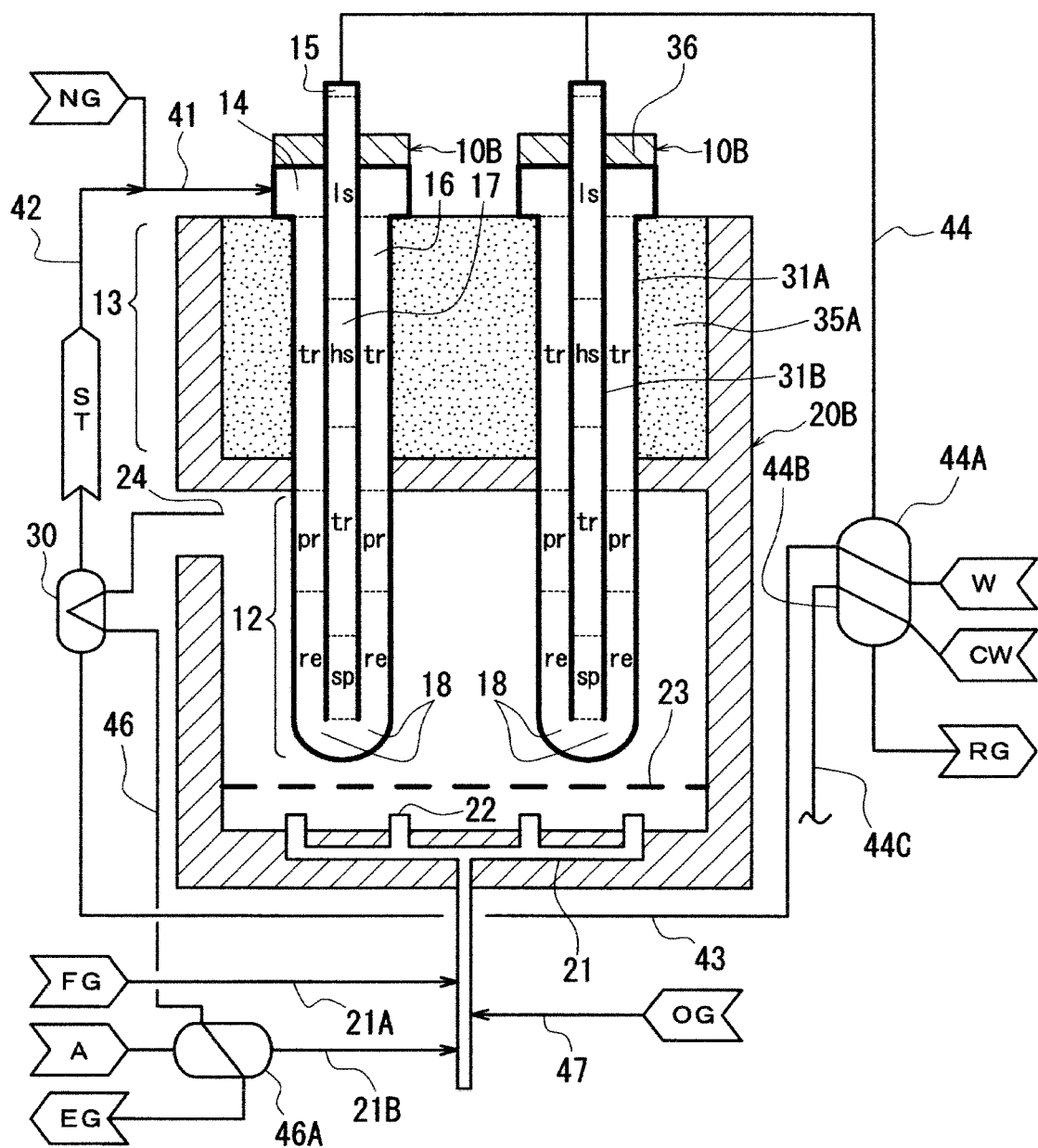

[FIG. 11]
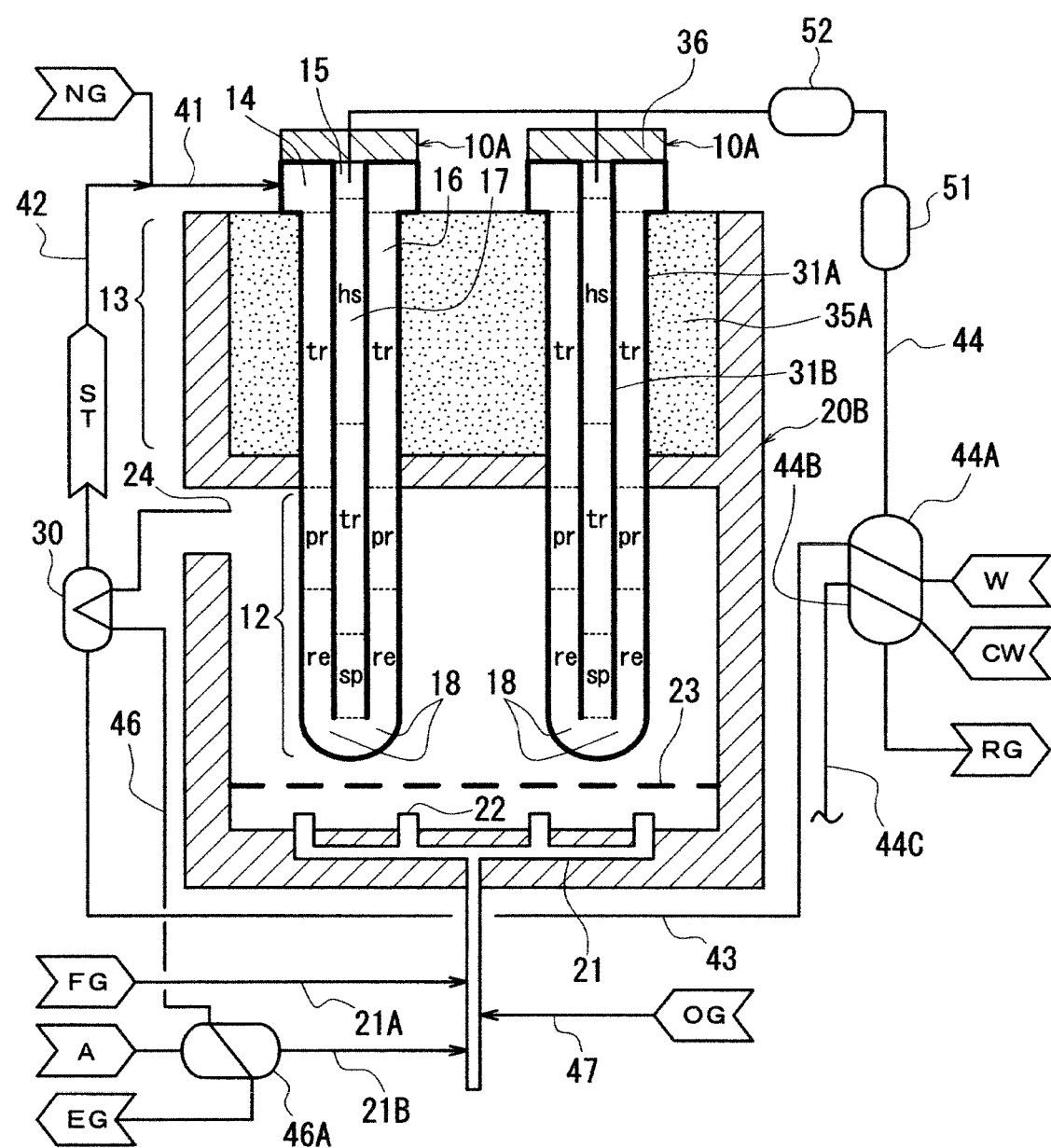

[FIG. 12]
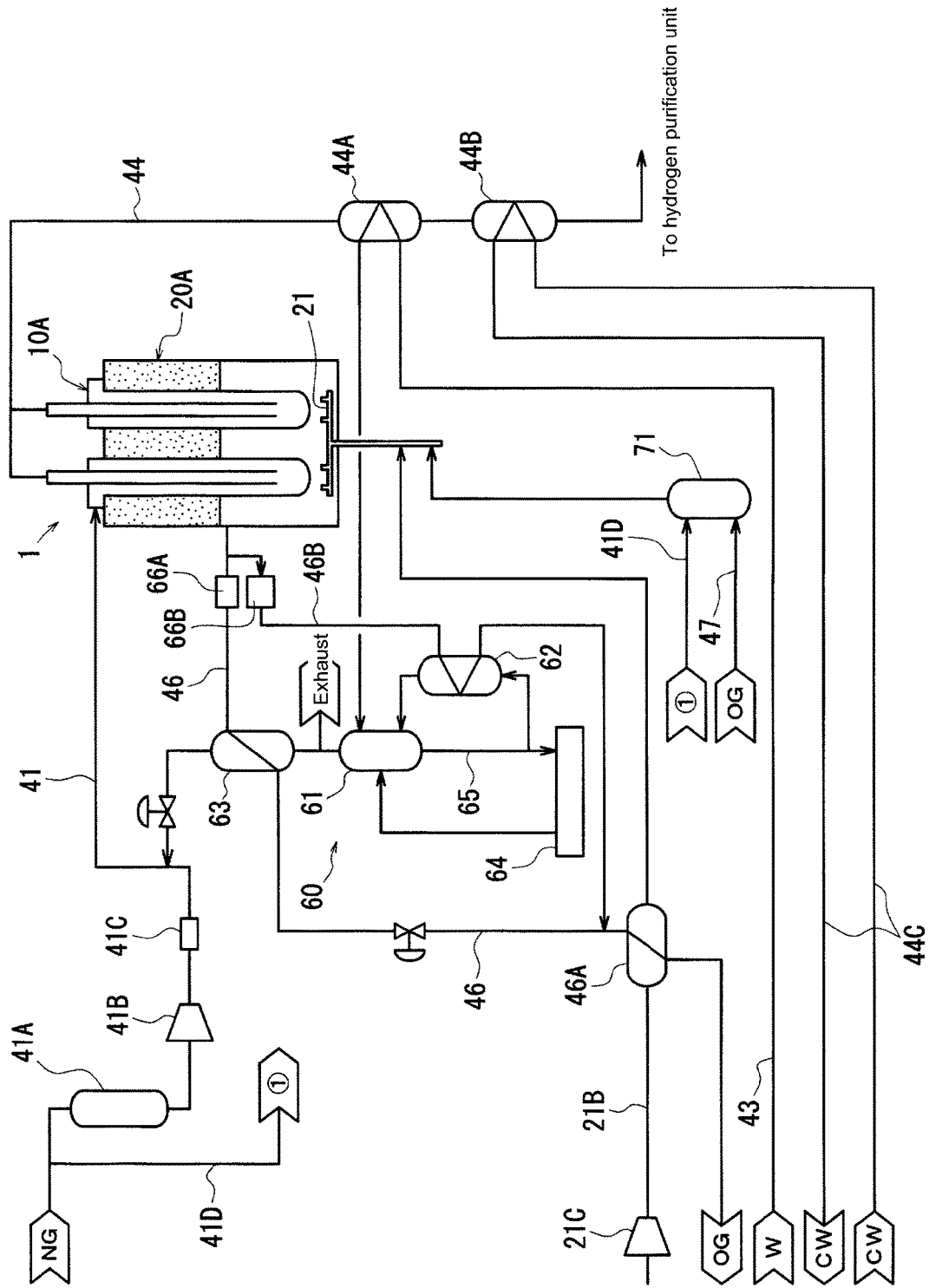

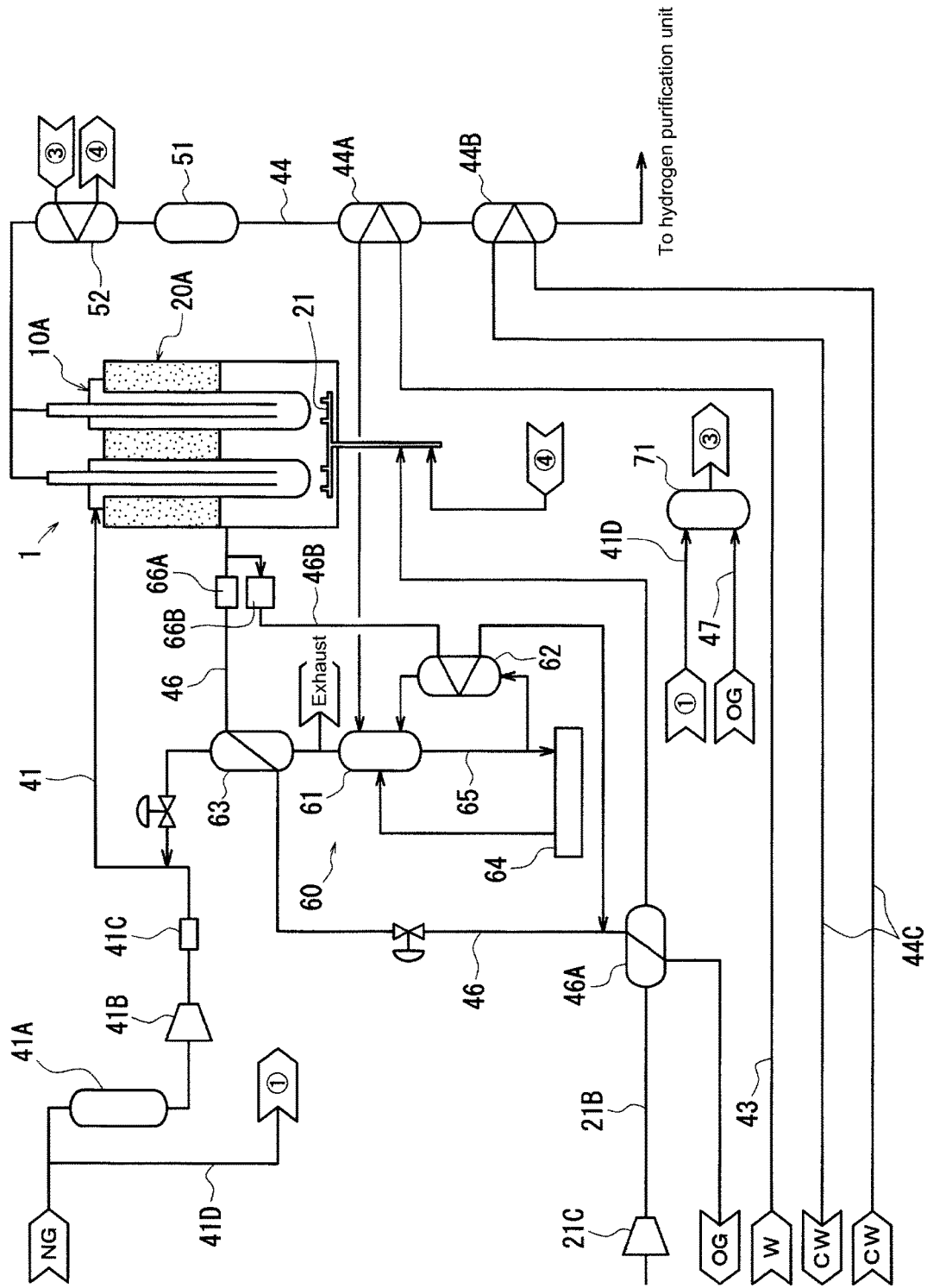
[FIG. 13]

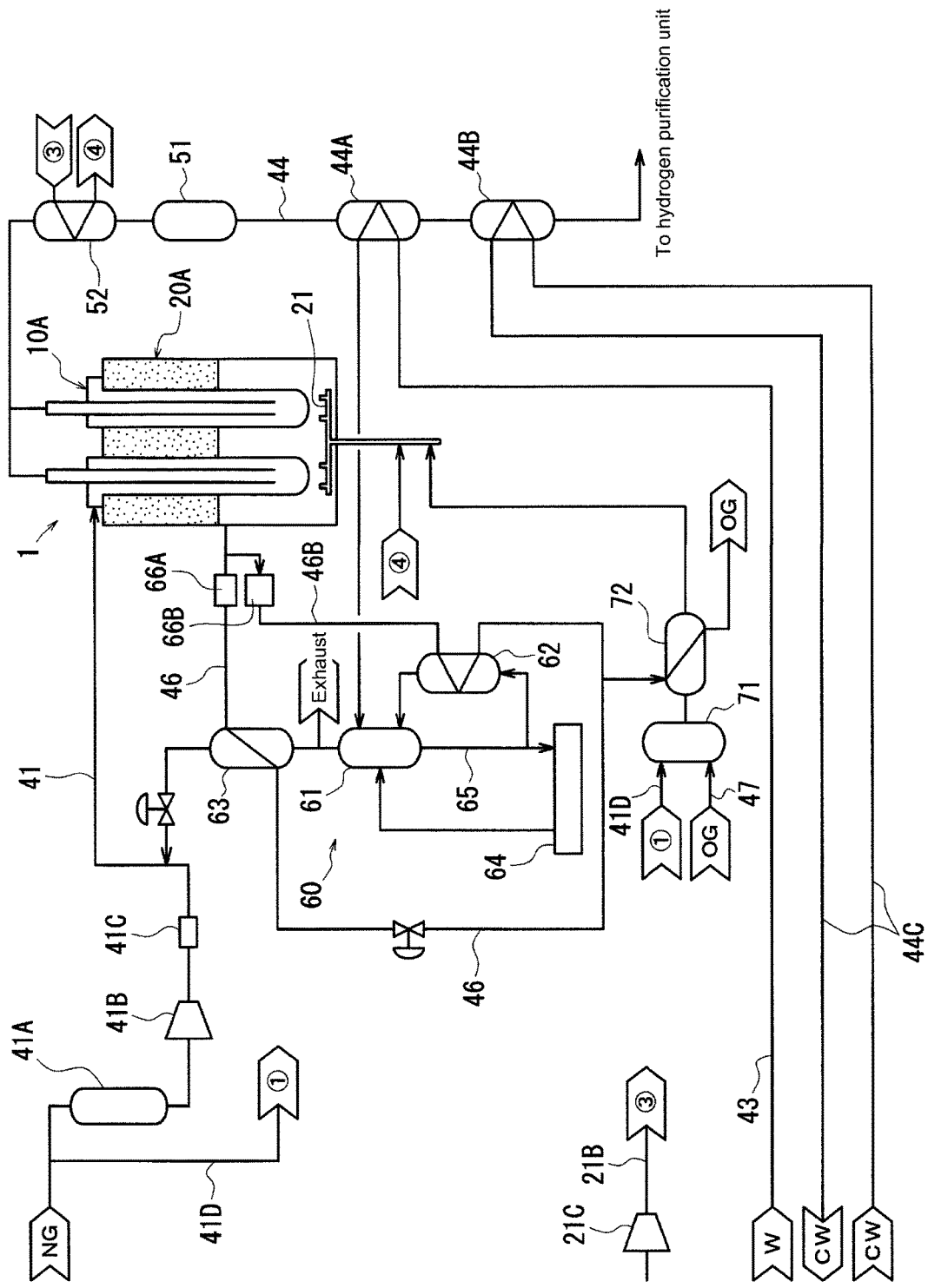
[FIG. 14]

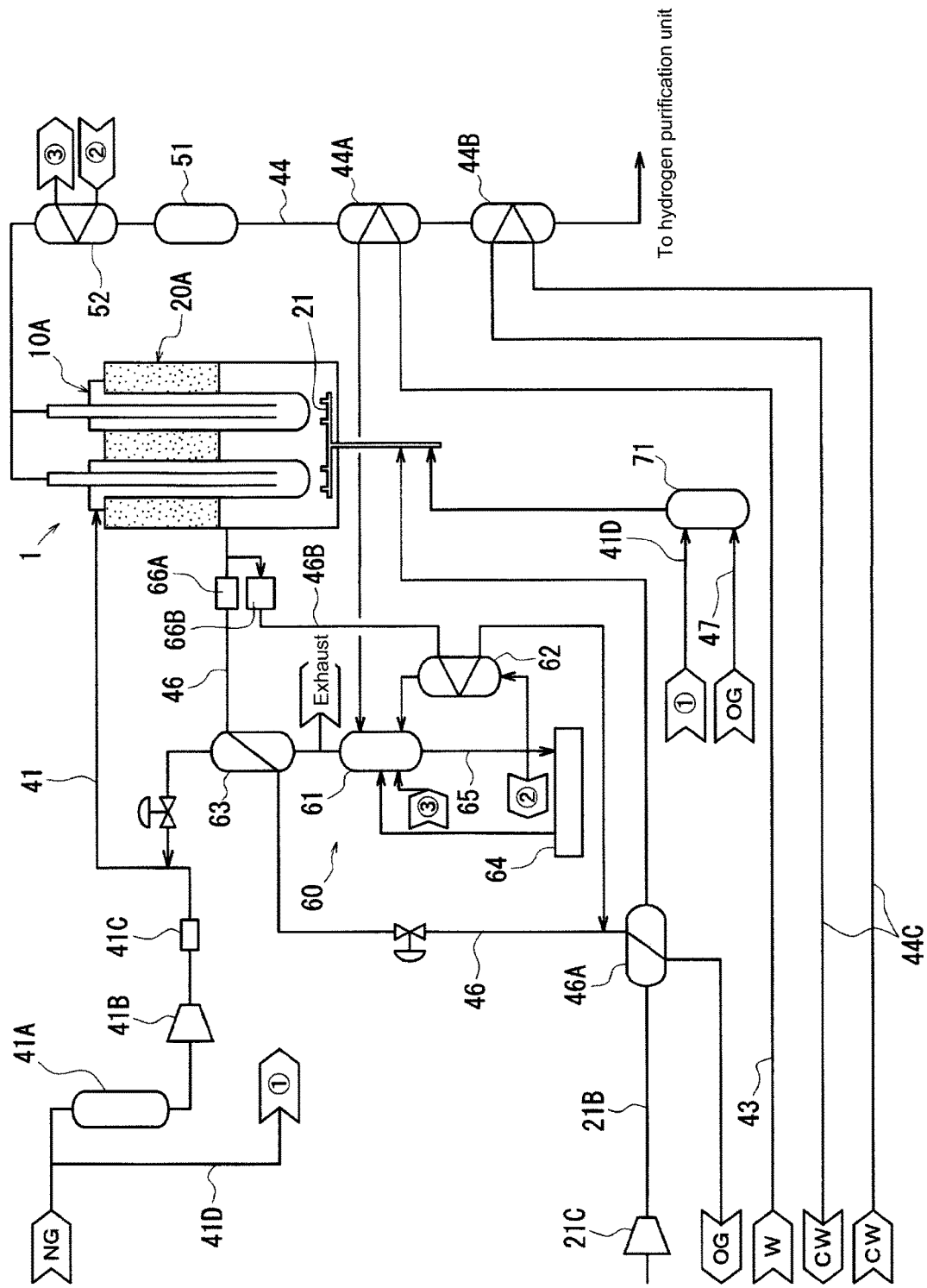
[FIG. 15]

HYDROGEN GENERATOR

TECHNICAL FIELD

The present invention relates to a hydrogen generator that uses hydrocarbon gases such as natural gas or the like, water, and air (or oxygen) as raw materials, and generates hydrogen that is supplied to hydrogen utilizing facilities such as chemical plants or hydrogen stations, or the like.

BACKGROUND ART

Hydrogen is attracting attention as a major energy resource alternative to fossil fuels. Hydrogen can be manufactured by reforming hydrocarbon gases such as natural gas or the like by adding water and air (or oxygen). It possible to use not only natural gas but also other fossil fuels such as propane gas, gasoline, naphtha, kerosene, or the like, alcohols such as methanol or the like, and biogas or the like as said hydrocarbon gases. During such manufacture of hydrogen, hydrogen is generated at the place where it is required by reforming said raw materials using already constructed infrastructure such as for the transport of hydrocarbon gas.

Many such hydrogen generators have been operating that generate hydrogen-rich reformed gas generated by reforming raw material gas in a reformer, and that isolate product hydrogen in a hydrogen purification section, and are being used in industrial facilities such as chemical plants and in hydrogen stations.

Higher efficiencies of hydrogen generators are being demanded as the use of hydrogen for energy and hydrogen demand expand. In particular, improving the thermal efficiency of reformers that are operated under high temperature and high pressure conditions contributes greatly to cost reduction of the entire apparatus and higher efficiencies of the apparatus.

As prior art related to hydrogen generators, the present applicant is aware of Patent Documents 1 and 2 given below.

Patent Document 1

Patent Document 1 has the following description and discloses a multiple cylinder type reformer of a hydrogen generator.

As is shown in FIG. 2, each multiple cylinder type reformer 12 is configured to have a plurality of multiply-disposed cylindrical walls 21 to 24. The plurality of cylindrical walls 21 to 24 are formed, for example, with cylindrical shapes or elliptical cylindrical shapes. A combustion chamber 25 has been formed on the inside of the first cylindrical wall 21 from the inside among the plurality of cylindrical walls 21 to 25, and a burner 26 is disposed pointing downward above this combustion chamber 25.

A combustion exhaust gas flow path 27 is formed between the first cylindrical wall 21 and the second cylindrical wall 22. The bottom end of the combustion exhaust gas flow path 27 communicates with the combustion chamber 25, and a gas exhaust pipe 28 is provided at the top end of the combustion exhaust gas flow path 27. The combustion exhaust gas discharged from the combustion chamber 25 flows from the bottom to the top of the combustion exhaust gas flow path 27, and is exhausted to the outside via the gas exhaust pipe 28.

A combustion exhaust gas flow path 31 is formed between the first cylindrical wall 22 and the second cylindrical wall 23. The top portion of this first flow path 31 is formed as a preheating flow path 32, and a raw material supply pipe 33 and a reforming water supply pipe 34 are connected to the top end of this preheating flow path 32. A helical member 35 has been provided between the second cylindrical wall 22 and the third cylindrical wall 23, and the preheating flow path 32 is formed in the shape of a helix due to this helical member 35.

City gas is supplied from the raw material supply pipe 33 to this preheating flow path 32, and the amount of supply thereof is controlled by a control valve 33a provided in the raw material supply pipe 33, as is shown in FIG. 1. Further, reforming water is supplied from the reforming water supply pipe 34 (not shown in the diagram in FIG. 1) to the preheating flow path 32, as is shown in FIG. 2. Not only city gas and reforming water flow from above to below through the preheating flow path 32, but also water is evaporated by heat exchanging with the combustion gas via the second cylindrical wall 22. In this preheating flow path 32, a mixed gas is generated by the mixing of city gas and reforming water in the vapor phase (steam).

Above the CO shift converter catalyst layer 45 has been provided an oxidizing gas supply pipe 46, and a CO removing catalyst layer 47 has been provided at a level higher than the CO shift converter catalyst layer 45 in the second flow path 42. The oxidizing gas introduced through the oxidizing gas supply pipe 46, and, the reformed gas that has passed through the CO shift converter catalyst layer 45 are supplied to the CO removing catalyst layer 47. In the CO removing catalyst layer 47, carbon monoxide and oxygen react and get converted to carbon dioxide on the precious metal catalyst such as, for example, platinum or ruthenium. The reformed gas with carbon monoxide removed by the CO shift converter catalyst layer 45 and the CO removal catalyst layer 47 is discharged through the reformed gas discharge pipe 44.

Patent Document 2

Patent Document 2 has the following description and discloses a hydrogen generator for hydrogen stations.

Claim 1

A hydrogen generation system for hydrogen stations characterized in that, said hydrogen generation system for hydrogen stations that reforms raw material gas inside the hydrogen station and produces hydrogen that becomes the fuel for fuel cell vehicles is provided not only with a combustor, but also a complex reformer that is provided integrally with a steam reforming reaction section that carries out steam reforming reaction, a CO shift conversion reaction section that carries out CO shift conversion reaction, and a steam generator section that generates steam, and that reforms the reforming gas by producing hydrogen from a raw material gas by steam reforming reaction in said steam reforming reaction section and by CO shift conversion reaction in the CO shift conversion reaction section, and on the downstream side of this complex reformer is provided a hydrogen PSA apparatus that isolates and purifies hydrogen from the reformed gas.

Next, we describe the aspects of producing hydrogen from a raw material gas and reforming into a reformed gas in a complex reformer, and the structure thereof.

Firstly, as is shown in FIG. 2 and FIG. 3, the complex reformer 1 is made to have an overall shape of a substantially cylindrical shape with steps by constituting from a first cylindrical body 21 with a vertically oriented cylindrical shape in the top portion and a second cylindrical body 22 with a vertically oriented cylindrical shape having a larger diameter than the first cylindrical body 21 in the bottom portion, and the entire peripheries of these first cylindrical body 21 and the second cylindrical body 22 are covered by high performance special thermal insulation material 23.

In addition, a raw material gas flow inlet 26 is provided in the upper part of the first cylindrical body 21, and introduces the raw material gas mixed with steam supplied by a mixer 13. Further, a reformed gas discharge outlet 27 is provided in the upper portion, and reformed gas reformed by generating hydrogen from the raw material gas is discharged on the downstream side of said complex reformer 1.

In addition, in the circular shaped space inside the chamber, a ring shaped thermal insulator cylinder 55 is provided on the side of the second cylindrical body 22, and this thermal insulator cylinder opens an opening for a part of said space inside the chamber. Further, a ring shaped space is formed between the special thermal insulation wall 25 and the thermal insulator cylinder 55 in the sideward portion of the space inside the chamber, and a steam generation section 6 is provided in this ring shaped space. This steam generation section 6 has a pipe 56 disposed in the shape of a helix, by passing pure water inside this pipe 56, pure water is converted into steam due to the combustion in a burner chamber provided above the middle inside the internal space of the chamber, and generating steam because of this. Further, the steam generated in this steam generator section 6 is supplied to the mixer 13 provided on the upstream side of that complex reformer 1, and mixed there with the raw material gas.

REFERENCE DOCUMENT(S) OF PRIOR ART

Patent Documents

[Patent Document 1] JP2017-088488A
[Patent Document 2] JP2016-060649A

SUMMARY OF THE INVENTION

Problems(s) to be Solved by the Invention

Problems in Patent Document 1

In said Patent Document 1, in the multiple cylinder type reformer 1 having a burner 26 at the center, a preheating flow path 32 that internally houses a helical member 35 has been provided surrounding the burner 26. In other words, water is evaporated in the preheating flow path 32 that is provided surrounding the burner 26. Therefore, the temperature in the periphery of said preheating flow path 32 decreases, temperature fluctuations occur, and the thermal efficiency of the reformer is not good by that extent. Further, a preheating flow path 32 having a complex helical structure has been placed inside the multiple cylinder type reformer 1 which reaches high temperatures. It is cumbersome to prepare such a structural body, the cost associated with preparation thereof becomes high, and ease of maintenance is extremely bad.

In addition, in said Patent Document 1, said multiple cylinder type reformer 1 has a combustion chamber 25 having a burner 26 has been arranged at the center, the reforming catalyst layer 36 has been provided on the outside thereof, and the reformed gas flow path 43 has been arranged further on the outside thereof. In this structure, the combustion exhaust gas is present on the inside of the reforming catalyst layer 36, and reformed gas is present on the outside thereof. The reforming reaction in said reforming catalyst layer 36 is an endothermic reaction. Therefore, in said reforming catalyst layer 36, it is considered that the heat radiation to the outside reformed gas flow path 43 becomes larger than the heat radiation to the inside combustion chamber 25. As a consequence, there is the problem that a temperature difference is generated between the inside and outside of the reforming catalyst layer 35, and the reforming efficiency decreases by that extent.

In addition, in Patent Document 1, as has been mentioned in (0031), an oxidizing gas is being used in the CO removal catalyst layer 47. The CO removal catalyst layer 47 removes the CO generated in the reforming reaction expressed by the following Equation (1).

In this manner, in an apparatus using an oxidizing gas, not only that the cost of the equipment becomes high becomes the structure of the apparatus becomes complicated, such as it is necessary to provide an oxidizing gas supplying pipe, or the like, the running cost also increases by the amount of the oxidizing gas. In addition, it is expected that the load on the succeeding stage hydrogen purification section increases because the impurities increase.

$$CO + 1/2 O_2 \rightarrow CO_2 \qquad \text{Eqn. (1)}$$

Further, in Patent Document 1, since a plurality of multiple cylinder type reformers 12 are being used, city gas and steam flow rate adjustment valves are necessary for each multiple cylinder type reformer 12. Therefore, control becomes complicated, and even the equipment cost becomes high.

Problems in Patent Document 2

In the above Patent Document 2, the complex reformer 1 has a reforming reaction section with a quadruple pipe structure. Said quadruple pipe structure is configured from an inside cylinder 41, an inside intermediate cylinder 44, an outside intermediate cylinder 45, and an outside cylinder 42. A combustor 3 has been disposed at the middle of said inside cylinder 41. A preliminary reforming section 7 and a steam reforming reaction section 4 that reform the raw material gas have been disposed between said internal cylinder 41 and internal intermediate cylinder 44 and between the outer intermediate cylinder 45 and the outer cylinder 42. Between the inside intermediate cylinder 44 and the outside intermediate cylinder 45 have been disposed a high temperature CO shift conversion reaction catalyst layer 5b and low temperature CO shift conversion reaction catalyst layer 5a that carry out CO shift conversion reaction of the reformed gas. In addition, a steam generation section 6 having a helical structure is disposed in the periphery of said steam reforming reaction section 4.

In this manner, in the apparatus of said Patent Document 2, water is evaporated in the steam generation section 6 provided in the periphery of the steam reforming reaction section 4. Therefore, the temperature in the periphery of that steam generation section 6 decreases. In other words, in said steam reforming reaction section 4, the temperature outside decreases below the temperature inside, temperature fluctuations occur, and the thermal efficiency of reforming is not good by that extent. In addition, it is cumbersome to provide a complex helical structure inside the complex reformer 1 that reaches high temperatures, the cost associated with preparation thereof becomes high, and ease of maintenance is extremely bad.

Furthermore, in said structure, said preliminary reforming section 7 and steam reforming reaction section 4 reach higher temperatures near the combustor 3 at the center than on the outside. Because of this, in addition to the progress of deterioration of the catalyst filled at the center, since heat is conveyed to the catalyst on the outside, there is the possibility of excessive combustion being added in the combustor 3, and of generation of heat loss. Since the steam generator is inside the complex reformer 1, it is difficult to carry out open inspection, and the ease of maintenance is extremely bad. In particular, in the case of large apparatuses, since the volume of the steam generating section 6 makes it a class 1 pressure vessel, it is necessary to carry out open inspection every year. Therefore, considering the ease of maintenance, there is the problem that it is not possible to apply to large apparatuses.

The present invention was made in order to solve the above problems, and was made with the following objects.

To provide a hydrogen generator having small temperature fluctuations of the reforming region, the thermal efficiency is improved, and the ease of maintenance is good.

Means for Solving the Problems

In order to achieve the above objects, a hydrogen generator as set forth in Claim 1 adopted the following configuration.

Said structure is provided with a reforming catalyst that causes hydrocarbon gas and steam to carry out a reforming reaction and reform into a hydrogen rich reformed gas, a reformer that is filled with said reforming catalyst and in which said reforming reaction is carried out, and a combustion chamber for combusting a fuel gas and obtaining reaction heat that is applied to said reforming reaction, at least the reforming region carrying out said reforming reaction in said reformer is disposed inside said combustion chamber, and a steam generator that generates steam introduced into said reformer is provided outside said combustion chamber.

The hydrogen generator as set forth in Claim 2 adopted the following configuration in addition to the configuration disclosed in Claim 1.

Said reformer is provided with, on the outside of said combustion chamber, an introducing section that introduces hydrocarbon gas and steam, and an outside region provided with a discharging section that discharges reformed gas, and said reforming region is provided on the opposite side of said outside region.

The hydrogen generator as set forth in Claim 3 adopted the following configuration in addition to the configuration disclosed in Claim 2.

Said reformer is configured to be provided with an upstream region that communicates with said introducing section, a downstream region that communicates with said discharging section, and a gas reversing section located between said upstream region and said downstream region, and said reforming region comprises said gas reversing section.

The hydrogen generator as set forth in Claim 4 adopted the following configuration in addition to the configuration disclosed in Claim 2 or Claim 3.

Said combustion chamber is provided with a burner for combusting said fuel gas and applying the heat of combustion to said reforming region, said burner is disposed so that the nozzles thereof are in a space on the side of said reforming region in said combustion chamber and also on the opposite side of said outside region.

The hydrogen generator as set forth in Claim 5 adopted the following configuration in addition to the configuration disclosed in Claim 4.

A plurality of nozzles of said burner is provided pointing towards said reforming region.

The hydrogen generator as set forth in Claim 6 adopted the following configuration in addition to the configuration disclosed in Claim 4 or Claim 5.

Said combustion chamber is provided with a flow regulating member that regulates the flow of heat of combustion due to said burner.

The hydrogen generator as set forth in Claim 7 adopted the following configuration in addition to the configuration disclosed in any one of Claim 2 to Claim 6.

On said external region side in said combustion chamber has been provided an exhaust heat recovering section that recovers the exhaust heat inside said combustion chamber.

Effects of the Invention

A hydrogen generator as set forth in Claim 1 is provided with a reforming catalyst, a reformer, and a combustion chamber. Said reforming catalyst causes a hydrocarbon gas and steam to carry out reforming reaction and reform into a hydrogen rich reformed gas. Said reformer is filled with said reforming catalyst and said reforming reaction is carried out therein. Said combustion chamber combusts fuel gas and obtains the reaction heat applied to said reforming reaction.

In the present invention, at least the reforming region of said reformer carrying out said reforming reaction is disposed inside said combustion chamber, and in addition, the steam generator that generates the steam introduced into said reformer is provided on the outside of said combustion chamber.

In this manner, in the present invention, the steam generator such as the conventional preheating flow path or steam generating section us provided on the outside of the combustion chamber. Therefore, complicated helical structures are not provided in the combustion chamber which reaches high temperatures. Therefore, it is possible to greatly reduce the cost associated with the preparation of the apparatus, and the ease of maintenance is vastly improved. In particular, this is advantageous in large equipment for which it is necessary to carry out open inspections every year. Furthermore, in the present invention, said reforming region is disposed inside said combustion chamber. Therefore, it is possible to ensure uniformity of temperature of the reforming region, and to prevent reduction in the reforming efficiency caused by temperature fluctuations.

In addition, since an oxidizing agent gas is not used, it is possible to simplify the structure of the apparatus suppressing the equipment cost and running cost, and the load on the later stage hydrogen purification unit due to impurities is not increased.

In the hydrogen generator as set forth in Claim 2, said reformer is provided with said reforming region and outside region. Said outside region is provided with, on the outside of said combustion chamber, an introducing section that introduces hydrocarbon gas and steam, and a discharging section that discharges reformed gas. Further, said reforming region is provided on the opposite side of said outside region.

The temperature can easily fall in the introducing section that introduces the hydrocarbon gas and steam, and the temperature can easily become unstable. Therefore, by placing that introducing section outside said combustion chamber, the temperature of the reforming region disposed inside the combustion chamber becomes stable. Therefore, it is possible to ensure uniformity of temperature of the reforming region, and to prevent reduction in the reforming efficiency caused by temperature fluctuations.

In the hydrogen generator as set forth in Claim 3, said reformer is provided with an upstream region, a downstream region, and a gas reversing section. Said upstream region communicates with said introducing section. Said downstream region communicates with said discharging section, and said gas reversing section is present in between said upstream region and said downstream region. Further, said reforming region is configured to comprise said gas reversing section.

Therefore, it is possible without tediousness to realize without undue effort a structure of providing on the outside of the combustion chamber an outside region provided with said introducing section and discharging section, and to dispose the reforming region on the opposite side thereof inside the combustion chamber. In addition, it is easy to apply uniform heat of combustion to said reforming region by making said reforming region the region comprising said gas reversing section. Therefore, it is possible to ensure uniformity of temperature of the reforming region, and to prevent reduction in the reforming efficiency caused by temperature fluctuations.

The hydrogen generator as set forth in Claim 4 has a combustion chamber that is provided with a burner. Said burner combusts said fuel gas and applies the heat of combustion to said reforming region. In addition, said burner is disposed so that the nozzles thereof are in a space on the side of said reforming region in said combustion chamber and also on the opposite side of said outside region.

Therefore, it is easy to apply uniform heat of combustion to said reforming region. Further, it is possible to ensure uniformity of temperature of the reforming region, and to prevent reduction in the reforming efficiency caused by temperature fluctuations.

In the hydrogen generator as set forth in Claim 5, a plurality of nozzles of said burner are provided pointing towards said reforming region.

Therefore, it is easy to apply the heat of combustion from the burner to said reforming region uniformly. Further, it is possible to ensure uniformity of temperature of the reforming region, and to prevent reduction in the reforming efficiency caused by temperature fluctuations.

The hydrogen generator as set forth in Claim 6 has a combustion chamber that is provided with a flow regulating member that regulates the flow of heat of combustion due to said burner.

Because of the presence of said flow regulating member, it is easy to apply the heat of combustion from the burner to said reforming region uniformly. Further, it is possible to ensure uniformity of temperature of the reforming region, and to prevent reduction in the reforming efficiency caused by temperature fluctuations.

In the hydrogen generator as set forth in Claim 7, on said external region side in said combustion chamber is disposed an exhaust heat recovering section that recovers exhaust heat inside said combustion chamber.

Therefore, the exhaust heat after applying the heat of combustion to the reforming region can be recovered effectively. The recovered exhaust heat can be reused effectively.

BRIEF DESCRIPTION OF THE DRAWINGS

FIG. 1 is a configuration diagram for explaining the overall configuration of a hydrogen generator of a mode of carrying out the present invention.

FIG. 2 is a configuration diagram for explaining the reforming unit in the first mode of said hydrogen generator.

FIG. 3 is a cross-sectional view drawing of the reformer in said first mode.

FIG. 4 is a configuration diagram for explaining the reforming unit in a second mode of said hydrogen generator.

FIG. 5 is a cross-sectional view drawing of the reformer in said second mode, where (A) is a first example, and (B) is a second example.

FIG. 6 is a first modified example, and is a drawing showing a sample configuration of the burner, where, (A) is a first example, (B) is a second example, and (C) is a third example.

FIG. 7 is a second modified example, and is a drawing showing a sample configuration of the flow regulating member, where, (A) is a first example, (B) is a second example, (C) is a third example, and (D) is the fourth example.

FIG. 8 is a third modified example, and is a drawing showing a sample configuration of the exhaust heat recovering section, where, (A) is a first example, (B) is a second example, (C) is a third example and (D) is the fourth example.

FIG. 9 is a fourth modified example, and is a drawing showing a sample configuration of the combustion chamber.

FIG. 10 is a fifth modified example, and is a drawing showing a sample configuration of the reformer.

FIG. 11 is a sixth modified example, and is a drawing showing a sample configuration in which a low temperature CO shift converter is connected externally.

FIG. 12 is a seventh modified example, and is a drawing showing a sample configuration provided with a steam generator unit.

FIG. 13 is an eighth modified example, and is a drawing showing a first sample configuration provided with a stream generator unit, and a low temperature CO shift converter is connected externally.

FIG. 14 is a ninth modified example, and is a drawing showing a second sample configuration provided with a stream generator unit, and a low temperature CO shift converter is connected externally.

FIG. 15 is a tenth modified example, and is a drawing showing a third sample configuration provided with a stream generator unit, and a low temperature CO shift converter is connected externally.

MODES FOR CARRYING OUT THE INVENTION

Next, the embodiments of the present invention are described in detail below.

Overall Configuration

FIG. 1 is a configuration diagram for explaining the overall configuration of a hydrogen generator of a mode of carrying out the present invention.

This hydrogen generator reforms a hydrocarbon gas and generates a hydrogen rich reformed gas, and further generates hydrogen if necessary.

As said hydrocarbon gases, it possible to use not only saturated hydrocarbon gases such as methane, ethane, propane, butane, or the like, but also other fossil fuels such as natural gas, gasoline, naphtha, kerosene, or the like, gases having hydrocarbons as the main constituents such as biogas, or the like, or alcohols such as methanol, or the like. An example in which natural gas is used as said hydrocarbon gas is described in the following explanations.

Said hydrogen generator is provided with a reforming unit 1 and a hydrogen purification unit 2. Said reforming unit 1 causes a reforming reaction of said hydrocarbon gas and steam and generates a hydrogen rich reformed gas. Said hydrogen purification unit purifies hydrogen by removing impurities other than hydrogen from said reformed gas.

To said reforming unit 1 is connected a hydrocarbon introducing path 41 that introduces hydrocarbon gas, and a steam introducing path 42 that introduces steam is merged with said hydrocarbon introducing path 41. Said steam introducing path 42 is connected to the pure water introducing path 43 via the steam generator 30.

A reformed gas path 44 that discharges reformed gas is connected to said reforming unit 1. The downstream of said reformed gas path 44 is connected to said hydrogen purification unit 2.

A hydrogen take out path 45 that takes out purified hydrogen is connected to said hydrogen purification unit 2. Further, an off-gas path 47 that takes out off-gas is connected to said hydrogen purification unit 2.

Reforming Unit

Said reforming unit 1 is provided with a reformer 10 and a combustion chamber 20, and said reformer 10 is filled with a reforming catalyst. The details of the reformer 10, combustion chamber 20, and the reforming catalyst are described later.

A hydrocarbon introducing path 41 described above is connected to said reformer 10 so that hydrocarbon gas is introduced into the reformer 10. In said hydrocarbon introducing path 41 have been provided, from the upstream side thereof, a desulfurizer 41A, a compressor 41B, and a flow rate controller 41C. Said desulfurizer 41A removes sulfur component from the hydrocarbon gas, said compressor 41B increases the pressure of the hydrocarbon gas, and said flow rate controller 41C controls the flow rate of the hydrocarbon gas.

A steam introducing path 42 described above is merged with said hydrocarbon gas introducing path 41, so that steam is introduced into said reformer 10. Pure water introduced into the pure water introducing path 43 is introduced into said steam introducing path after becoming steam. Said pure water introducing path 43 passes through the preheating unit 44A and the steam generator 30, and steam is generated by the pure water getting evaporated in said steam generator 30.

A reformed gas path 44 described above is connected to said reformer 10, and high temperature reformed gas is discharged. In said reformed gas path 44 have been provided, from the upstream side thereof, a preheating unit 44A, and a cooler 44B. Said preheating unit 44A preheats said pure water by the heat exchange between the reformed gas flowing through the reformed gas path 44 and the pure water flowing through the pure water introducing path 43. Said cooler 44B cools the reformed gas by the cooling water flowing through the cooling water path 44C.

A burner 21 has been provided in said combustion chamber 20. The heat of combustion obtained by combusting the fuel gas by said burner 21 is applied to said reformer 10, so that reaction heat is applied to the reforming reaction.

The fuel gas supplying path 21A is connected to said burner 21. In this example, said fuel gas supplying path 21A has branched from said hydrocarbon gas introducing path 41, and the hydrocarbon gas is supplied to the burner 21 as the fuel gas. An air supplying path 21B that extends from the air blower 21C is connected to said burner 21. Said air supplying path 21B is passing through an air heater 46A so that the air supplied to the burner 21 is heated in advance. An off-gas path 47 described above is connected to said burner 21, so that the off-gas taken out from said hydrogen purification unit 2 is supplied to said burner 21.

An exhaust gas path 46 is connected to said combustion chamber 20. The exhaust gas is taken into the inside of the combustion chamber 20 from said exhaust gas path 46 so that the exhaust heat inside said combustion chamber 20 is recovered. In said exhaust gas path 46 have been provided, from the upstream side thereof, a steam generator 30, and an air heater 46A. In said steam generator 30, the pure water that has come flowing from the pure water introducing path 43 is heated by the exhaust gas taken out from said combustion chamber 20 thereby evaporating said pure water, and generating steam. In said air heater 46A, the gas flowing through said air supplying path 21B is heated by said exhaust gas.

Hydrogen Purification Unit

Said hydrogen purification unit 2 is a PVSA (Pressure Vacuum Swing Adsorption) apparatus comprising a plurality of (four, in this example) adsorption tanks 2A, 2B, 2C, and 2D. Said adsorption tanks 2A, 2B, 2C, and 2D are filled with an adsorbing material that adsorbs the impurities in the reformed gas.

Said reformed gas path 44 through which the reformed as discharged from said reformer 10 flows is connected to the low purity side of each of said adsorption tanks 2A, 2B, 2C, and 2D. In said reformed gas path 44 has been provided a vapor liquid separator 44D on the downstream said cooler 44B. Said vapor liquid separator 44D removes the steam originating from the steam that was introduced as a part of the raw materials. The moisture content that was removed by said vapor liquid separator 44D is discharged through a drain pipe 44E.

A hydrogen take out path 45 that takes out purified hydrogen is connected to the high purity sides of each of said adsorption tanks 2A, 2B, 2C, and 2D. A flare stack path 45A that discharges flare stack branches from said hydrogen taking out path 45.

An off-gas path 47 is connected to the low purity sides of each of said adsorption tanks 2A, 2B, 2C, and 2D. In said off-gas path 47 have been provided, from the upstream side thereof, a vacuum pump 47A, and an off-gas holder 47B. Said vacuum pump 47A regenerates the adsorbing material by desorbing the impurities that were adsorbed by the adsorbing material by reducing the pressure of each of said adsorption tanks 2A, 2B, 2C, and 2D. Said off-gas holder 47B temporarily stores the gas comprising the impurities desorbed from the adsorbing material. The downstream of said off-gas path 47 is connected to said burner 21. The off-gas that comes out of said off-gas holder 47B is combusted as a part of the fuel gas by the burner 21.

Mode 1

FIG. 2 and FIG. 3 are drawings for explaining the details of said reforming unit in the first mode of said hydrogen generator. In FIG. 2, the configuration of the peripheral equipment is written additionally on the vertical cross-section of the reforming unit 1. In FIG. 3, the nozzle 22 of the burner 21 is written additionally on the vertical cross-section of the reformer 10.

As has been described above, said reforming unit 1 is provided with a reformer 10 and a combustion chamber 20, and said reformer 10 is filled with a reforming catalyst. In the first mode, the configuration is one reformer 10 for the combustion chamber 20.

Reformer

In this example, said reformer 10 presents a quadruple pipe structure. A first pipe 11A, a second pipe 11B, a third pipe 11C, and fourth pipe 11D are disposed in a concentric manner from the outside. The bottom end portions of said first pipe 11A and fourth pipe 11D are connected at the bottom portion with a U-shaped cross-section. The bottom end portions of said second pipe 11B and the third pipe 11C are maintaining a gap with the bottom portion with a U-shaped cross-section. The top end portions of said first pipe 11A and second pipe 11B are connected at the roof portion with a box-shaped cross-section. The top end portions of said third pipe 11C and the fourth pipe 11D are connected at the roof portion with a box-shaped cross-section. The portion between the top end portions of said second pipe 11B and the third pipe 11C is an opening portion, and this opening portion is covered by a lid member 36.

The upper side of said reformer 10 is the outside region 13 that is present outside said combustion chamber 20, and the lower side is the reforming region 12 that is present inside said combustion chamber 20. In other words, said reforming region 12 is provided on the opposite side of said outside region 13. The periphery of said outside region 13 is covered with a heat insulating material layer.

Said outside region 13 is provided with, on the outside of said combustion chamber 20, an introducing section 14 that introduces hydrocarbon gas and steam, and a discharging section 15 that discharges reformed gas. Said introducing section 14 is present in the space above in the proximity of the roof portion where the top end portions of said first pipe 11A and the second pipe 11B are connected, and in the space above in the proximity of the roof portion where the top end portions of said third pipe 11C and the fourth pipe 11D are connected. The hydrocarbon introducing path 41 communicates with said introducing section 14 introducing hydrocarbon gas and steam into the reformer 10. Said discharging section 15 is an opening portion between the top end portions of said second pipe 11B and said third pipe 11C. The reformed gas path 44 communicates with said discharging section 15 so that reformed gas can be taken out from the reformer 10.

Said reformer 10 is provided with an upstream region 16 that communicates with said introducing section 14, and a downstream region 17 that communicates with said discharging section 15. Said upstream region 16 is an aisle space between the first pipe 11A and the second pipe 11B, and an aisle space between the third pipe 11C and the fourth pipe 11D. Said upstream region 16 communicates with said introducing section 14. Said downstream region 17 is an aisle space between the top end portions of said second pipe 11B and said third pipe 11C. Said downstream region 17 communicates with said discharging section 15.

In addition, said reformer 10 is provided with a gas reversing section 18 in between said upstream region 16 and said downstream region 17. Said gas reversing section 18 is a portion where the bottom end of said upstream region 16 and the bottom end of said downstream region 17 communicate with each other. The gas that has flown through said upstream region from above to below is reversed in the gas reversing section 18, and flows through said downstream region 17 from below to above.

Further, said reforming region 12 is configured to comprise said gas reversing section 18.

Said reformer 10 is filled with said reforming catalyst and said reforming reaction is carried out.

Explaining in more detail, in the internal space of said reformer 10 have been provided a heat transfer layer tr, a preliminary reforming layer pr, a reforming layer re, a space layer sp, a high temperature CO shift conversion reaction layer hs, and a low temperature CO shift conversion reaction layer ls. The heat transfer layer tr, the preliminary reforming layer pr, and the reforming layer re are disposed, from the upstream side, from said upstream region 16 towards the gas reversing region 18. In said downstream region 17 have been provided, from the upstream side, the space layer sp, the heat transfer layer tr, the high temperature CO shift conversion reaction layer hs, and the low temperature CO shift conversion reaction layer ls. It is possible to partition, using a mesh or the like through which gas can pass easily, between the heat transfer layer tr, the preliminary reforming layer pr, the reforming layer re, the space layer sp, the high temperature CO shift conversion reaction layer hs, and the low temperature CO shift conversion reaction layer ls.

Said heat transfer layer tr is filled with heat transfer particles that do not contribute to the reaction. It is possible to use, for example, alumina, or the like for said heat transfer particles. Said heat transfer layer tr promotes the heat transfer of the raw material gas and the reformed gas.

Said preliminary reforming layer pr and reforming layer re are filled with said reforming catalyst. It is possible to use, for example, Ru based or Ni based reforming catalyst for said reforming catalyst. Hydrocarbon is converted into $H_2$ and CO by a reforming reaction expressed by the following Eqn. (2) (in the case of methane) in said preliminary reforming layer pr and reforming layer re.

$$CH_4 + H_2O \rightarrow CO + 3H_2 \qquad (2)$$

It is preferable to set the range of preliminary reforming temperature in said preliminary reforming layer pr to about 350 to 600° C. It is preferable to set the range of preliminary reforming temperature in said preliminary reforming layer pr to about 500 to 900° C. In each of the above temperature ranges, the settings are made so that the reforming temperature becomes higher than the preliminary reforming temperature.

Said space layer is a space not filled with any particles or the like.

Said high temperature CO shift conversion reaction layer hs and the low temperature CO shift conversion reaction layer ls are filled with the CO shift conversion reaction catalyst. It is possible to use, for example, Fe—Cr based or Cu—Zn based CO shift conversion reaction catalyst for said CO shift conversion reaction catalyst. The said high temperature CO shift conversion reaction layer hs and the low temperature CO shift conversion reaction layer ls, CO is reformed into $H_2$ by a CO shift conversion reaction expressed by the following Eqn. (3).

$$CO + H_2O \rightarrow CO_2 + H_2 \qquad (3)$$

It is preferable to set the range of the high temperature CO shift conversion reaction temperature in said high temperature CO shift conversion reaction layer hs to about 200 to 500° C. It is preferable to set the range of low temperature CO shift conversion reaction temperature in said low temperature CO shift conversion reaction layer ls to about 150 to 300° C. In each of the above temperature ranges, the settings are made so that the high temperature CO shift conversion reaction temperature becomes higher than the low temperature CO shift conversion reaction temperature.

In said reformer 10, because of the reforming reaction due to said reforming catalyst and the CO shift conversion reaction Combustion Chamber Said combustion chamber 20 combusts fuel gas and obtains the reaction heat that is applied to said reforming reaction. In other words, since the reaction of the above Eqn. (2) is an endothermic reaction, heat is applied from the outside to the reforming catalyst, and the reaction is made progress continuously.

Said combustion chamber 20 has a box shape encircled by a wall surface of heat resistant material. The reformer 10 has being disposed in said combustion chamber 20 so as to penetrate through the roof portion. At this time, said reformer 10 is disposed so that the reforming region 12 of said reformer 10 is made to be present inside the combustion chamber 20, and the outside region 13 is made to be present outside the combustion chamber 20.

Said combustion chamber 20 is provided with a burner 21 for combusting said fuel gas and applying the heat of combustion to said reforming region. In this example, said burner 21 has been provided in the bottom portion of the combustion chamber 20. To said burner 21 has been connected a fuel gas supplying path 21A and an air supplying path 21B, and the fuel gas and air are supplied for combustion. It is possible to use a hydrocarbon gas for said fuel gas. In addition, an off-gas path 47 is connected to said burner 21, so that an off-gas is merged with said fuel gas.

Said burner 21 is disposed so that the nozzles thereof are in a space on the side of said reforming region 12 in said combustion chamber 20 and also on the opposite side of said outside region 13.

A plurality of nozzles 22 of said burner 21 are provided pointing towards said reforming region 12.

In other words, in this example, the nozzles 22 of the burner 21 are disposed so that they face upwards at the bottom portion of the combustion chamber 20. In this example, 8 numbers of said nozzles 22 have been provided. Among these, 4 numbers of nozzles 22 are disposed at substantially equal spacing inside the fourth pipe 11D of the reformer 10. The remaining 4 numbers of nozzles 22 are disposed at substantially equal spacing on the outside of the first pipe 11A of the reformer 10. Because of this, it is possible to heat the reforming region 12 of the reformer 10 as uniformly as possible by the 8 numbers of nozzles 22.

On said external region 13 side in said combustion chamber 20 is disposed an exhaust heat recovering section 24 that recovers exhaust heat inside said combustion chamber 20.

Said exhaust heat recovering section 24 is the inlet of said exhaust gas path 46. In this example, the inlets of said exhaust gas path 46 are provided—one in the central upper portion of the combustion chamber 20 and reformer 10, and the other on the upper surface of the combustion chamber 20.

Reforming Unit

Said reforming unit 1 has been configured by the above configuration of the reformer 10 and the combustion chamber 20. In this reforming unit 1, of said reformer 10, at least the reforming region 12 that carries out said reforming reaction is disposed inside said combustion chamber 20. In addition, in this reforming unit 1, the steam generator 30 that generates the steam that is introduced into said reformer 10 is provided on the outside of said combustion chamber 20.

Mode 2

FIG. 4 and FIG. 5 are drawings for explaining the details of said reforming unit in the second mode of said hydrogen generator. In FIG. 4, the configuration of the peripheral equipment is written additionally on the vertical cross-section of the reforming unit 1. In FIG. 4, the nozzles 22 of the burner are written additionally on the horizontal cross-section surface of the reformer 10A.

This reforming unit 1 is basically similar to the first mode, like symbols have been assigned to like portions, and descriptions thereof have been omitted. In the first mode, although explanations were given of one reformer 10 with a quadruple pipe structure being provided, in the second mode, the configuration is one in which a plurality of reformers 10A with a dual pipe structure are provided in the combustion chamber 20A. One each of the flow control valves for the raw material gas and steam have been provided irrespective of the number of reformers 10A.

Reformer

In said reformer 10A, a first pipe 31A, and a second pipe 31B from the outside are disposed in a concentric manner. The bottom end portion of said first pipe 31A is blocked by the bottom portion with a U-shaped cross-section. The bottom end portion of said second pipe 31B is maintaining a gap with said bottom portion with a U-shaped cross-section. The top end portions of said first pipe 31A and second pipe 31B are connected at the roof portion with a box-shaped cross-section. The top end portion of said second pipe 31B is an opening portion, and this opening portion is covered by a lid member 36.

In said reformer 10A, the upper side is the outside region 13 that is present outside said combustion chamber 20A, and the lower side is the reforming region 12 that is present inside said combustion chamber 20A. In other words, said reforming region 12 is provided on the opposite side of said outside region 13. The periphery of said outside region 13 is covered with a heat insulating material layer.

In the outside region 13 that is on the outside of said combustion chamber 20 are provided an introducing section 14 that introduces hydrocarbon gas and steam, and a discharging section 15 that discharges reformed gas. Said introducing section 14 is the space above in the proximity of the roof portion where the top end portions of said first pipe 11A and the second pipe 11B are connected. The hydrocarbon introducing path 41 communicates with said introducing section 14 introducing hydrocarbon gas and steam into the reformer 10A. Said discharging section 15 is an opening portion at the top end portion of said second pipe 11B. The reformed gas path 44 communicates with said discharging section 15 so that reformed gas can be taken out from the reformer 10A.

Said reformer 10A is provided with an upstream region 16 that communicates with said introducing section 14, and a downstream region 17 that communicates with said discharging section 15. Said upstream region 16 is an aisle space between the first pipe 11B and the second pipe 11B. Said upstream region 16 communicates with said introducing section 14. Said downstream region 17 is an aisle space which is the hollow portion of the second pipe 11B. Said downstream region 17 communicates with said discharging section 15.

In addition, said reformer 10A is provided with a gas reversing section 18 that is present in between said upstream region 16 and said downstream region 17. Said gas reversing section 18 is a portion where the bottom end of said upstream region 16 and the bottom end of said downstream region 17 communicate with each other. The gas that has flown through said upstream region from above to below is reversed in the gas reversing section 18, and flows through said downstream region 17 from below to above.

Further, said reforming region 12 is configured to comprise said gas reversing section 18.

FIG. 5 shows an example of disposition of a reformer 10A with a dual pipe structure.

FIG. 5(A) is an example of disposing in a concentric manner. Six reformers 10A are disposed on in the inside in a ring fashion, and on the outside thereof have been disposed 12 reformers 10A in a ring fashion. Nozzles 22 are provided at uniform intervals between the inside ring shape and the outside ring shape, and nozzles 22 are provided at uniform intervals on further outside of the outside ring shape.

FIG. 5(B) is an example of disposing in a concentric manner. This is an example of disposing 18 numbers of reformers 10A at uniform intervals. Nozzles 22 are provided at uniform intervals between the inside hexagonal shape and the outside hexagonal shape, and nozzles 22 are provided at uniform intervals on further outside of the outside hexagonal shape.

In FIGS. 5(A) and (B), it is possible to increase or decrease the number of reformers 10A.

Combustion Chamber

Said combustion chamber 20A is provided with a flow regulating member 23 that regulates the flow of heat of combustion due to said burner 21. In this example, said flow regulating member 23 is disposed oriented in the horizontal direction in the space between the bottom end of the reformer 10A and the nozzles 22. It is possible to use, for example, punching metal for said flow regulating member 23.

Further, in this combustion chamber 20A, one inlet of said exhaust gas path 46 is provided on the upper surface of the combustion chamber 20A as said exhaust heat recovering section 24. Not provided in the central upper portion of the combustion chamber 20.

Reforming Unit

Said reforming unit 1 has been configured by the above configuration of the reformer 10A and the combustion chamber 20A. In this reforming unit 1, of said reformer 10, at least the reforming region 12 that carries out said reforming reaction is disposed inside said combustion chamber 20A. In addition, in this reforming unit 1, the steam generator 30 that generates the steam that is introduced into said reformer 10A is provided on the outside of said combustion chamber 20A.

Modified Example

A modified example is described. In the following modified example, although explanations are given of a case based on the above second mode, it is also possible to make this based on the above first mode.

First Modified Example

FIG. 6 is a first modified example, and shows a sample configuration of the burner 21.

FIG. 6(A) is a first example. In this example, a plurality of burners 21 are disposed oriented in the horizontal direction so that the nozzles 22 are pointing towards the center in the proximity of the bottom portion of the combustion chamber 20A. The number of burners 21 can be increased or decreased suitably.

FIG. 6(B) is a second example. In this example, a plurality of burners 21 are disposed oriented in the horizontal direction so that the nozzles 22 are pointing upwards in the proximity of the bottom portion of the combustion chamber 20A. The number of burners 21 can be increased or decreased suitably. It is also possible to use together with the mode of FIG. 6(A).

FIG. 6(C) is a third example. This is an example in which a plurality of nozzles 22 is provided in one burner 21. This burner 21 is disposed so that the nozzles 22 are pointing upwards in the proximity of the bottom portion of the combustion chamber 20A. The number of nozzles 22 can be increased or decreased suitably.

Second Modified Example

FIG. 7 is a second modified example, and shows a sample configuration of the flow regulating member 23. In this example, although explanations are given based on the configuration of the burner 21 shown in FIG. 6(A), it is also possible to explain based on FIG. 6(B) or (C).

FIG. 7(A) is a first example. In this example, said flow regulating member 23 is disposed oriented in the horizontal direction in the space between the bottom end of the reformer 10A and the nozzles 22. It is possible to use, for example, punching metal for said flow regulating member 23. It is also possible to dispose a plurality of said flow regulating members 23. The thermal efficiency is increased by arranging the flow of the combustion gas.

FIG. 7(B) is a second example. In this example, said flow regulating member 23 is disposed slightly above the bottom end of the reformer 10A, and oriented in the horizontal direction. It is possible to use, for example, punching metal for said flow regulating member 23. It is also possible to use together with the mode of FIG. 7(A). It is also possible to dispose a plurality of said flow regulating members 23. The thermal efficiency is increased by arranging the flow of the combustion gas.

FIG. 7(C) is a third example. This is an example of using baffle plates as said flow regulating members 23. In this example, said baffle plates are disposed on the periphery of the reformer 10A, and said baffle plates are disposed in a zigzag manner in the up and down direction for every reformer 10. The thermal efficiency is increased by making the flow of the combustion gas to meander.

FIG. 7(D) is a fourth example. This is an example of using baffle plates as said flow regulating members 23. In this example, said baffle plates are disposed on the periphery of the reformer 10A, and said baffle plates are disposed in a zigzag manner in the up and down direction between neighboring reformers 10. The thermal efficiency is increased by making the flow of the combustion gas to meander.

Third Modified Example

FIG. 8 is a third modified example, and shows a sample configuration of the exhaust heat recovering section 24.

FIG. 8(A) is a first example. In this example, one each of the exhaust heat recovering section 24 is provided respectively on the upper left and right surfaces of the combustion chamber 20A.

FIG. 8(B) is a second example. In this example, one of said exhaust heat recovering section 24 has been provided in the upper middle portion of the combustion chamber 20A.

FIG. 8(C) is a third example. In this example, the exhaust heat recovering section 24 is provided as an inlet of the exhaust duct 38 that extends from the upper surface of the combustion chamber 20A. Said inlet opens in upper center inside the combustion chamber 20A. On the other hand, a baffle plate 37 is standing upright in the center of the bottom portion of the combustion chamber 20A. Direct penetration of the heat flow into said inlet is being restricted because of the top end portion of said baffle rod 37 facing said inlet. Because of this, the combustion gas from the center of the bottom portion being cut short by the exhaust heat recovering section 24 is being prevented.

FIG. 8(D) is a fourth example. In this example, the exhaust duct 38 from the center of the bottom portion of the combustion chamber 20A has an opening in the center of the upper portion of the combustion chamber 20A.

Fourth Modified Example

FIG. 9 is a fourth modified example, and is a drawing showing a sample configuration of the combustion chamber 20.

In this example, the combustion chamber 20B has a box shape encircled by a wall surface of heat resistant material. A plurality of reformers 10A has being disposed in said combustion chamber 20B so as to penetrate through the roof portion. At this time, each of said reformers 10A is disposed so that the reforming region 12 of said reformer 10A is made to be present inside the combustion chamber 20B, and the outside region 13 is made to be present outside the combustion chamber 20B.

In this state, said combustion chamber 20B has the furnace wall extended up to a height that covers the periphery of the outside region 13 of said reformer 10A. Further, the inside of said extended furnace wall is filled with a heat insulting material 35A, and the periphery of the outside region other than the above is covered with the heat insulating material. 35A.

Because of this configuration, the heat insulation of the outside region 13 increases, and it is possible to prevent wasteful heat radiation, and to increase the thermal efficiency.

All others are similar to the above second modified example, like symbols have been assigned to like portions, and descriptions thereof have been omitted.

Fifth Modified Example

FIG. 10 is a fifth modified example, and is a drawing showing a sample configuration of the reformer 10.

In this example, in the reformer 10B, the second pipe 31B is extending upwards. The upper portion of said second pipe 31B is projecting upwards beyond the lid member 36. Further, the low temperature CO shift conversion layer ls is provided extending to said projecting region.

Because of this type of configuration, heat radiation from the low temperature CO shift conversion layer ls is promoted, it becomes easy to create a temperature difference between the low temperature CO shift conversion layer ls and the high temperature CO shift conversion layer hl, and it is easy to carry out temperature control of the low temperature CO shift conversion layer ls.

All others are similar to the above fourth modified example, like symbols have been assigned to like portions, and descriptions thereof have been omitted.

Sixth Modified Example

FIG. 11 is a sixth modified example, and is a drawing showing a sample configuration in which a low temperature CO shift converter is connected externally.

In this example, a low temperature CO shift conversion layer ls has not been provided inside the second pipe 31B of the reformer 10A. The configuration is one in which a low temperature CO shift converter 51 is connected externally instead of the low temperature CO shift conversion layer ls. In other words, a low temperature CO shift converter 51 is provided in the reformed gas path 44 connected to the reformer 10A. In addition, in said reformed gas path 44, a heat exchanger 52 has been provided in between the reformer 10A and the low temperature CO shift converter 511, for cooling the gas coming out from the high temperature CO shift conversion layer hs.

Because of this type of configuration, the gas coming out from the high temperature CO shift conversion layer hs is definitely cooled, it becomes easy to create a temperature difference between the low temperature CO shift conversion layer hs and the high temperature CO shift conversion layer ls, and it is easy to carry out temperature control of the low temperature CO shift conversion layer ls.

All others are similar to the above fourth modified example, like symbols have been assigned to like portions, and descriptions thereof have been omitted.

Seventh Modified Example

FIG. 12 is a seventh modified example, and is a drawing showing a sample configuration provided with a steam generator unit.

In this example, a steam generator unit 60 has been provided instead of the steam generator 30.

Said steam generator unit 60 is configured by providing with a steam drum 61, an evaporator 62, a steam heater 63, and a pure water heater 64. In said steam generator unit 60, the pure water that has come flowing from the pure water introducing path 43 is heated by the exhaust gas taken out from said combustion chamber 20A thereby evaporating said pure water, and generating steam.

Said steam drum 61 is connected to the downstream end of the pure water introducing path 43 thereby introducing the pure water that is preheated in the preheater 44A. The pure water introduced into said steam drum 61 is circulated in the circulating path 65 having said evaporator 62 in the middle.

Said evaporator 62 heats the pure water that is circulating in the circulating path 65. The second exhaust gas path 46B that has branched from the exhaust gas path 46 is passing through said evaporator 62, and the pure water is heated by the heat of the exhaust gas that passes through said second exhaust gas path 46B. The downstream end of the second exhaust gas path 46B merges with the downstream side of said exhaust gas path 46. In said evaporator 62, pure water is heated until steam and liquid are in a mixed state.

Said steam heater 63 communicates with the upper portion of said steam drum 61, and steam is introduced from the mixture of steam and liquid stored inside said steam drum 61. The second exhaust gas path 46B is passing through said steam heater 63, and the steam is heated by the heat of the exhaust gas that passes through said exhaust gas path 46. The steam heated by said steam heater 63 is merged with the hydrocarbon introducing path 41.

Said pure water heater 64 heats the liquid when the temperature of the liquid drops inside said steam drum. Electricity or the like can be used as the heat source for heating by said pure water heater 64.

Respective flow rate controllers 66A and 66B have been provided in said exhaust gas path 46 and the second exhaust gas path 46B, and the flow rate ratio of the exhaust gas made to flow through said exhaust gas path 46 and the exhaust gas made to flow through the second exhaust gas path 46B. Because of this, control is carried out so that the temperature becomes constant of the steam from the steam heater 63 merged with the hydrocarbon gas introducing path 41.

In other words, since the reforming reaction in the reformer 10A is an endothermic reaction, if the quantity of hydrogen generation becomes less, heat absorption to the reforming reaction becomes less, and the temperature of the exhaust gas increases. On the other hand, if the quantity of hydrogen generation becomes high, heat absorption to the reforming reaction becomes large, and the temperature of the exhaust gas decreases. Therefore, the flow rate of the exhaust gas made to flow through the second exhaust gas path 46B is increased if the temperature of the exhaust gas increases, and if the flow rate of the exhaust gas made to flow through the second exhaust gas path 46B is decreased if the temperature of the exhaust gas decreases. Because of this, it is possible to make constant the quantity of exhaust gas passing through the exhaust gas path 46 via the steam heater 63, and to make constant the temperature of the steam that is coming from the steam heater 63 and that is merged with the hydrocarbon gas introducing path 41.

The entire amount of heat of said steam generator unit 60 becomes insufficient when the state of high quantity generation of hydrogen has continued and the exhaust gas temperature has fallen, and the state of small flow rate of exhaust gas flowing through the second exhaust gas path 46B has continued. Consequently, since the liquid temperature inside said steam drum 61 decreases, said pure water heater 64 is activated, and the liquid inside said steam drum 61 is heated.

In other words, this example has a fuel buffer tank 71 that temporarily holds the fuel supplied to the burner 21. The bottom end of the hydrocarbon branch path 41D that has branched from the hydrocarbon introducing path 41 and the bottom end of the off-gas path 47 coming out from the hydrogen purification unit 2 are connected to said fuel buffer tank 71. A mixed gas of hydrocarbon and off-gas is supplied from said fuel buffer tank 71 to the burner 21.

Because of such a configuration, even if there is any fluctuation in the quantity of hydrogen generated, it is possible to make constant the temperature of the steam that is merged with the hydrocarbon gas introducing path 41. Further, since the fuel to the burner 21 is supplied from the fuel buffer tank, it is easy to adjust the heating power of the burner 21.

All others are similar to the above second modified example, like symbols have been assigned to like portions, and descriptions thereof have been omitted.

Eighth Modified Example

FIG. 13 is an eighth modified example, and is a drawing showing a first sample configuration provided with a stream generator unit 60, and a low temperature CO shift converter 51 connected externally.

In this example, a low temperature CO shift converter 51 is provided in the reformed gas path connected to the reformer 10A. In addition, in said reformed gas path 44, a heat exchanger 52 has been provided in between the reformer 10A and the low temperature CO shift converter 51l, for cooling the gas coming out from the high temperature CO shift conversion layer hs.

Further, the fuel supplied from the fuel buffer tank 71 to the burner 21 is preheated by first passing said fuel through said heat exchanger 52. In other words, the cooling in said heat exchanger 52 is carried out by the heat exchange at the time of preheating the fuel supplied to the burner 21 from the fuel buffer tank 71.

Because of this type of configuration, the gas coming out from the high temperature CO shift conversion layer hs is definitely cooled, it becomes easy to create a temperature difference between the low temperature CO shift conversion layer hs and the high temperature CO shift conversion layer ls, and it is easy to carry out temperature control of the low temperature CO shift conversion layer ls. Further, the thermal efficiency is increased due to preheating the fuel supplied to the burner 21.

All others are similar to the above seventh modified example, like symbols have been assigned to like portions, and descriptions thereof have been omitted.

Ninth Modified Example

FIG. 14 is a ninth modified example, and is a drawing showing a second sample configuration provided with a stream generator unit 60, and a low temperature CO shift converter 51 connected externally.

In other words, a fuel heater is provided that preheats the fuel supplied to the burner 21 from the fuel buffer tank 71. Therefore, said heat exchanger 52 is not provided. The downstream of the exhaust gas path 46 coming from said steam generator unit 60 is passing through said fuel heater 72. The heat source that preheats said fuel is the exhaust gas that flows downstream in the exhaust gas path 46.

In addition, the air supplying path 21B is passing through said heat exchanger 52 that cools the gas coming out of the high temperature CO shift conversion layer hs. Because of this, the gas coming out the high temperature CO shift conversion layer hs is cooled, and the air supplied to the burner 21 is heated.

All others are similar to the above eighth modified example, like symbols have been assigned to like portions, and descriptions thereof have been omitted.

Tenth Modified Example

FIG. 15 is a tenth modified example, and is a drawing showing a third sample configuration provided with a stream generator unit, and a low temperature CO shift converter 51 is connected externally.

In this example, a low temperature CO shift converter 51 is provided in the reformed gas path connected to the reformer 10A. In addition, in said reformed gas path 44, a heat exchanger 52 has been provided in between the reformer 10A and the low temperature CO shift converter 51l, for cooling the gas coming out from the high temperature CO shift conversion layer hs.

A branch path that is branched from the circulating path 65 of the steam generator unit 60 is passed through said heat exchanger 52. Because of this, the liquid (hot water) flowing through said branch path is heated, making it a mixture of hot water and steam. The branch path that has come away from said heat exchanger 52 is connected to the steam drum 61 of said steam generator unit 60. The mixture of hot water and steam heated in said heat exchange 52 circulates in said steam drum 61.

In other words, the circulating path 65 of the steam generating unit 60 is divided into three branch paths. The first branch path is the branch path that leads to the evaporator 62, the second branch path is the one that leads to the pure water heater 64, and the third branch path is the one that leads to the heat exchanger 52. The liquid surface inside said steam drum is controlled to a prescribed height, the steam in the upper portion is introduced into the steam heater 63, and the liquid in the bottom portion is made to flow through the circulating path 65. The liquid surface control inside said steam drum 61 can be carried out either by making the height of installation of said steam drum 61 appropriate, or by appropriately controlling the pressure inside said steam drum 61.

Because of this type of configuration, the gas coming out from the high temperature CO shift conversion layer hs is definitely cooled, it becomes easy to create a temperature difference between the low temperature CO shift conversion layer hs and the high temperature CO shift conversion layer ls, and it is easy to carry out temperature control of the low temperature CO shift conversion layer ls. Further, the thermal efficiency is increased due to preheating the fuel supplied to the burner 21.

In addition, since a part of the liquid that circulates through the circulating path 65 is heated in the heat exchanger 52 and is returned to the steam drum 61, it is difficult for the liquid temperature inside the steam drum 61 to fall. Because of this, it is difficult for the entire amount of heat of said steam generator unit 60 to become insufficient, even when the state of high quantity generation of hydrogen has continued and the exhaust gas temperature has fallen, and the state of small flow rate of exhaust gas flowing through the second exhaust gas path 46B has continued. The frequency of activation of said pure water heater 64 becomes small, and it is possible to save energy by that extent.

All others are similar to the above seventh modified example, like symbols have been assigned to like portions, and descriptions thereof have been omitted.

Effect of Each Mode

In the above manner, the hydrogen generators in each of the above modes In the above manner, the hydrogen generators in each of the above modes is provided with a reforming catalyst, a reformer 10 provided with a reforming catalyst, a reformer 10, and a combustion chamber 20. Said reforming catalyst causes a hydrocarbon gas and steam to carry out reforming reaction and reform into a hydrogen rich reformed gas. Said reformer 20 is filled with said reforming catalyst and said reforming reaction is carried out. Said combustion chamber 20 combusts fuel gas and obtains the reaction heat that is applied to said reforming reaction.

In each of the above modes, at least the reforming region of said reformer 10 carrying out said reforming reaction is disposed inside said combustion chamber 20, the reforming region 12 is disposed inside the said combustion chamber 20, and in addition, the steam generator 30 that generates the steam introduced into said combustion chamber 20 is provided on the outside of said combustion chamber 20.

In this manner, in each of the above modes, the steam generator such as the conventional preheating flow path or steam generating section is provided on the outside of the combustion chamber 20. Therefore, complicated helical structures are not provided in the combustion chamber 20 which reaches high temperatures. Therefore, it is possible to greatly reduce the cost associated with the preparation of the apparatus, and the ease of maintenance is vastly improved. In particular, this is advantageous in large equipment for which it is necessary to carry out open inspections every year. Furthermore, in each of the above modes, said reforming region 12 is disposed inside said combustion chamber. Therefore, it is possible to ensure uniformity of temperature of the reforming region 12, and to prevent reduction in the reforming efficiency caused by temperature fluctuations.

In addition, since an oxidizing agent gas is not used, it is possible to simplify the structure of the apparatus suppressing the equipment cost and running cost, and the load on the later stage hydrogen purification unit 2 due to impurities is not increased.

The hydrogen generator in each of the above modes, said reformer 10 is provided with said reforming region 12 and an outside region 13. Said outside region 13 is provided with, on the outside of said combustion chamber 20, an introducing section 14 that introduces hydrocarbon gas and steam, and a discharging section 15 that discharges reformed gas. Further, said reforming region 12 is provided on the opposite side of said outside region 13.

The temperature can easily fall in the introducing section 14 that introduces hydrocarbon gas and steam, and the temperature can easily become unstable. Therefore, by placing that introducing section 14 outside said combustion chamber, the temperature of the reforming region 12 disposed inside the combustion chamber becomes stable. Therefore, it is possible to ensure uniformity of temperature of the reforming region 12, and to prevent reduction in the reforming efficiency caused by temperature fluctuations.

In the hydrogen generator in each of said modes, said reformer 10 is provided with an upstream region 16, a downstream region 17, and a gas reversing section 18. Said upstream region 16 communicates with said introducing section 14, said downstream region 17 communicates with said discharging section 15, and said gas reversing section 18 is present in between said upstream region 16 and said downstream region 17. Further, said reforming region 12 is configured to comprise said gas reversing section 18.

Therefore, it is possible to realize without undue effort a structure of providing on the outside of the combustion chamber 20 an outside region 13 provided with said introducing section 14 and discharging section 15, and to dispose the reforming region 12 on the opposite side thereof inside the combustion chamber 20. In addition, it is easy to apply uniform heat of combustion to said reforming region 12 by making the region comprising said gas reversing section 18 as said reforming region 12. Further, it is possible to ensure uniformity of temperature of the reforming region 12, and to prevent reduction in the reforming efficiency caused by temperature fluctuations.

In the hydrogen generator of each of the above modes, said combustion chamber 20 is provided with a burner 21. Said burner 21 combusts said fuel gas and applies the heat of combustion to said reforming region 12. In addition, said burner 21 is disposed so that the nozzles 22 thereof are in a space on the side of said reforming region 12 in said combustion chamber 20 and also on the opposite side of said outside region 13.

Therefore, it is easy to apply uniform heat of combustion to said reforming region 12. Further, it is possible to ensure uniformity of temperature of the reforming region 12, and to prevent reduction in the reforming efficiency caused by temperature fluctuations.

In the hydrogen generator of each of the above modes, a plurality of nozzles 22 of said burner 21 are provided pointing towards said reforming region 12.

Therefore, it is easy to apply the heat of combustion from the burner 21 to said reforming region 12 uniformly. Further, it is possible to ensure uniformity of temperature of the reforming region 12, and to prevent reduction in the reforming efficiency caused by temperature fluctuations.

In the hydrogen generator of each of the above modes, said combustion chamber 20 is provided with a flow regulating member 23 that regulates the flow of heat of combustion due to said burner 21.

Because of the presence of said flow regulating member 23, it is easy to apply the heat of combustion from the burner 21 to said reforming region 12 uniformly. Further, it is possible to ensure uniformity of temperature of the reforming region 12, and to prevent reduction in the reforming efficiency caused by temperature fluctuations.

In a hydrogen generator of each of the above modes, on said external region 12 side in said combustion chamber 20 is disposed an exhaust heat recovering section 24 that recovers exhaust heat inside said combustion chamber 20.

Therefore, the exhaust heat after applying the heat of combustion to the reforming region 12 can be recovered effectively. The recovered exhaust heat can be reused effectively.

According to of each of the above modes, by not installing a CO removing unit, and by not using an oxidizing agent gas, it is possible to simplify the system, and to reduce the equipment cost and cost of utilities. In addition, since an oxidizing agent gas is not mixed with the reformed gas, the concentration of impurities decreases, and it is possible to reduce the load on the subsequent stage hydrogen purification unit 1.

In the reforming regions 12 made to be present inside the combustion chambers 20, 20A, since the entire outer peripheral portion is a region filled with the reforming catalyst, the heat receiving area increases with respect to the volume of catalyst. Because of this, it is possible to transfer the heat generated by the burner 21 to the reforming catalyst with a high efficiency.

Further, when the burner 21 is disposed at a suitable position in the lower portion of the combustion chambers 20, 20A, heat is applied uniformly to the reformers 10, 10A, thereby preventing deterioration of the reforming catalyst and thermal loss due to imbalance in the temperature.

Ease of maintenance is improved by installing the steam generator 30 outside the combustion chambers 20, 20A. It is possible to greatly reduce the maintenance cost and time when carrying out open inspections particularly in the case of large sized equipment that correspond to class 1 pressure vessels. In addition, by installing the steam generator 30 which reaches low temperatures compared to the temperatures inside the combustion chambers 20, 20A outside the combustion chambers 20, 20A, it becomes difficult for a partially low temperature region to be generated inside the combustion chambers 20, 20A. Because of this, it becomes easy for heat to get transferred to the reformers 10, 10A.

Other Modified Examples

The present invention can be applied, for example, to a hydrogen generator for fuel cells for homes or automobiles. Not only that, but it is also possible to apply even to a hydrogen generator for other fuel cells for plants, and to apply even to hydrogen generators for supplying hydrogen gas to hydrogen gas utilizing equipment other than fuel cells.

In addition, while particularly preferable embodiments of the present invention have been described above, the present invention is not limited to the examples provided and can be implemented through various types of modifications and the intention of the present invention is to include various modified examples of the present invention.

LIST OF SYMBOLS

1: Reforming unit
2: Hydrogen purification unit
2A: Adsorption tank
2B: Adsorption tank
2C: Adsorption tank
2D: Adsorption tank
10: Reformer
10A: Reformer
10B: Reformer
11A: First pipe
11B: Second pipe
11C: Third pipe
11D: Fourth pipe
12: Reforming region
13: Outside region
14: Introducing section
15: Discharging section
16: Upstream region
17: Downstream region
18: Gas reversing section
20: Combustion chamber
20A: Combustion chamber
20B: Combustion chamber
21: Burner
21A: Fuel gas supplying path
21B: Air supply path
21C: Air blower
22: Nozzle
23: Flow regulating member
24: Exhaust heat recovering section
30: steam generator
31A: First pipe
31B: Second pipe
35: Thermal insulation material layer
3A5: Thermal insulation material
36: Lid member
37: Baffle rod
38: Exhaust duct
41: Hydrocarbon introducing path
41A: Desulfurizer
41B: Compressor
41C: Flow controller
41D: Hydrocarbon branching path
42: Steam introducing path
43: Pure water introducing path
44: Reformed gas path
44A: Preheating unit
44B: Cooler
44C: Cooling water path
44D: Vapor liquid separator
44E: Drain pipe
45: Hydrogen taking out path
45A: Flare stack path
46: Exhaust gas path
46A: Air heater
46B: Second exhaust gas path
47: Off-gas path
47A: Vacuum pump 47B: Off-gas holder
51: Low temperature CO shift converter
52: Heat exchanger
60: steam generator unit
61: Steam drum
62: Evaporator
63: Steam heater
64: Pure water heater
65: Circulating path
66A: Flow rate controller
66B: Flow rate controller
71: Fuel buffer tank
72: Fuel heater

What is claimed is:

1. A hydrogen generator comprising:
a reforming catalyst that causes hydrocarbon gas and steam to carry out a reforming reaction and reforming into a hydrogen rich reformed gas;
a reformer that is filled with said reforming catalyst and in which said reforming reaction is carried out;
a combustion chamber for combusting a fuel gas and obtaining reaction heat that is applied to said reforming reaction,
said reformer having a reforming region where said reforming reaction is performed in said reformer inside said combustion chamber; and
a steam generator that generates steam introduced into said reformer, said steam generator provided outside said combustion chamber,
wherein the reformer has an external region located outside the combustion chamber,
wherein the external region has an upstream region leading to an introducing section where hydrocarbon gas and water vapor are introduced outside the combustion chamber and a downstream region leading to a discharging section where the reformed gas is discharged,
wherein the upstream region and downstream region are surrounded by heat insulating material,
wherein the reforming region further comprises a gas inversion section inside the combustion chamber and located between the upstream region and the downstream region,
wherein said combustion chamber is provided with a burner for combusting said fuel gas and applying the heat of combustion due to said burner to said reforming region,
wherein a plurality of nozzles of said burner are provided pointing towards said reforming region.

2. The hydrogen generator as set forth in claim 1, wherein said burner is disposed so that the nozzles on the burner are in a space on the side of said reforming region in said combustion chamber and also on an opposite side of said external region.

3. The hydrogen generator as set forth in claim 2, wherein said combustion chamber is provided with a flow regulating member that regulates flow of the heat of combustion due to said burner.

4. The hydrogen generator as set forth in claim 3, wherein an exhaust heat recovering section that recovers exhaust heat inside said combustion chamber is disposed on an external region side in said combustion chamber.

5. The hydrogen generator as set forth in claim 1, wherein an exhaust heat recovering section that recovers exhaust heat inside said combustion chamber is disposed on an external region side in said combustion chamber,
the exhaust heat recovered in the exhaust heat recovering section used to generate water vapor in the steam generator.

6. The hydrogen generator as set forth in claim 1, wherein said combustion chamber is provided with a flow regulating member that regulates the flow of heat of combustion due to said burner.

7. The hydrogen generator as set forth in claim 6, wherein an exhaust heat recovering section that recovers exhaust heat inside said combustion chamber is disposed on an external region side in said combustion chamber.

8. The hydrogen generator as set forth in claim 1, wherein an exhaust heat recovering section that recovers exhaust heat inside said combustion chamber is disposed on an external region side in said combustion chamber.

9. The hydrogen generator as set forth in claim 1, wherein a CO transformation layer is provided in the downstream region that is in the external region.

* * * * *